(12) United States Patent
Kajiwara et al.

(10) Patent No.: US 8,260,072 B2
(45) Date of Patent: Sep. 4, 2012

(54) IMAGE ENCODING APPARATUS AND METHOD OF CONTROLLING THE SAME

(75) Inventors: Hiroshi Kajiwara, Inagi (JP); Takeshi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 686 days.

(21) Appl. No.: 12/533,157

(22) Filed: Jul. 31, 2009

(65) Prior Publication Data
US 2010/0034478 A1 Feb. 11, 2010

(30) Foreign Application Priority Data

Aug. 7, 2008 (JP) ................................. 2008-204775

(51) Int. Cl.
*G06K 9/36* (2006.01)
(52) U.S. Cl. .................... 382/248; 375/235; 375/240.03; 375/240.23; 360/48
(58) Field of Classification Search .................. 382/232, 382/248; 375/235, 240.03, 240.23; 360/48
See application file for complete search history.

(56) References Cited

U.S. PATENT DOCUMENTS

| | | | | |
|---|---|---|---|---|
| 5,073,820 A | * | 12/1991 | Nakagawa et al. | 375/240.03 |
| 5,410,352 A | * | 4/1995 | Watanabe | 375/240.03 |
| 5,430,556 A | * | 7/1995 | Ito | 382/251 |
| 5,473,377 A | * | 12/1995 | Kim | 375/240.03 |
| 5,945,930 A | | 8/1999 | Kajiwara | 341/50 |
| 6,028,963 A | | 2/2000 | Kajiwara | 382/239 |
| 6,031,938 A | | 2/2000 | Kajiwara | 382/239 |
| 6,101,282 A | | 8/2000 | Hirabayashi et al. | 382/246 |
| 6,233,355 B1 | | 5/2001 | Kajiwara | 382/238 |
| 6,310,980 B1 | | 10/2001 | Kajiwara | 382/238 |
| 6,396,955 B1 | | 5/2002 | Abe | 382/232 |
| 6,501,859 B1 | | 12/2002 | Kajiwara | 382/239 |
| 6,549,676 B1 | | 4/2003 | Nakayama et al. | 382/246 |
| 6,560,365 B1 | | 5/2003 | Nakayama et al. | 382/233 |
| 6,567,562 B1 | | 5/2003 | Nakayama et al. | 382/246 |
| 6,665,444 B1 | | 12/2003 | Kajiwara | 382/240 |
| 6,711,295 B2 | | 3/2004 | Nakayama et al. | 382/232 |
| 6,768,819 B2 | | 7/2004 | Yamazaki et al. | 382/240 |
| 6,847,735 B2 | | 1/2005 | Kajiwara et al. | 382/233 |
| 6,879,726 B2 | | 4/2005 | Sato et al. | 382/239 |
| 6,879,727 B2 | | 4/2005 | Sato et al. | 382/239 |
| 6,917,716 B2 | | 7/2005 | Kajiwara et al. | 382/240 |

(Continued)

FOREIGN PATENT DOCUMENTS

JP 2000-013797 1/2000

*Primary Examiner* — Jingge Wu
*Assistant Examiner* — Eueng-Nan Yeh
(74) *Attorney, Agent, or Firm* — Fitzpatrick, Cella, Harper & Scinto

(57) ABSTRACT

This invention provides a technique of easily encoding image data to generate encoded data having high image quality within a target code amount using a small memory capacity by image encoding processing of performing frequency transform and quantization of each pixel block. A frequency transform unit separates image data into low frequency band data and high frequency band data. A coefficient quantizing unit, coefficient encoder, and code amount controller operate to encode the high frequency band data within a predetermined amount. When the encoding processing of the high frequency band data has ended, the quantization parameter of the low frequency band data is set based on the generated code amount of the high frequency band data. A coefficient quantizing unit, coefficient encoder, code amount detector, and quantization parameter updating unit operate to encode the low frequency band data into codes within a low frequency band target code amount.

9 Claims, 16 Drawing Sheets

U.S. PATENT DOCUMENTS

| | | | |
|---|---|---|---|
| 6,947,600 B1 | 9/2005 | Sato et al. | 382/233 |
| 6,985,630 B2 | 1/2006 | Kajiwara | 382/233 |
| 7,013,050 B2 | 3/2006 | Kajiwara | 382/240 |
| 7,031,536 B2 | 4/2006 | Kajiwara | 382/240 |
| 7,158,669 B2 | 1/2007 | Tanaka et al. | 382/166 |
| 7,302,105 B2 | 11/2007 | Kajiwara | 382/240 |
| RE39,984 E | 1/2008 | Kajiwara | 382/239 |
| 7,529,417 B2 | 5/2009 | Maeda et al. | 382/233 |
| 7,574,063 B2 | 8/2009 | Kajiwara et al. | 382/239 |
| 7,613,345 B2 | 11/2009 | Kajiwara et al. | 382/232 |
| 2004/0213347 A1 | 10/2004 | Kajiwara | 375/240.11 |
| 2006/0045362 A1 | 3/2006 | Ito et al. | 382/232 |
| 2006/0210176 A1 | 9/2006 | Kajiwara et al. | 382/232 |
| 2006/0262982 A1 | 11/2006 | Matsumoto et al. | 382/238 |
| 2007/0160299 A1 | 7/2007 | Kajiwara et al. | 382/240 |
| 2007/0217703 A1 | 9/2007 | Kajiwara | 382/238 |
| 2008/0089413 A1 | 4/2008 | Kishi et al. | 375/240.13 |
| 2008/0285867 A1 | 11/2008 | Kajiwara | 382/233 |
| 2009/0252232 A1 | 10/2009 | Kishi et al. | 375/240.24 |
| 2009/0252427 A1 | 10/2009 | Kishi et al. | 382/244 |

\* cited by examiner

▨ DC COMPONENT
☐ AC COMPONENT

| | 1 | 5 | 6 |
|---|---|---|---|
| 2 | 4 | 7 | 12 |
| 3 | 8 | 11 | 13 |
| 9 | 10 | 14 | 15 |

FIG. 7

| Cn | -41 | -7 | 28 | -1 | ... |
|---|---|---|---|---|---|
| POSITIVE/NEGATIVE SIGN | 1 | 1 | 0 | 1 | ... |

UPPER-BIT PORTION

| | -41 | -7 | 28 | -1 | ... |
|---|---|---|---|---|---|
| EIGHTH DIGIT | 0 | 0 | 0 | 0 | ... |
| SEVENTH DIGIT | 0 | 0 | 0 | 0 | ... |
| SIXTH DIGIT | 1 | 0 | 0 | 0 | ... |
| | 0 | 0 | 1 | 0 | ... |

LOWER-BIT PORTION

| | -41 | -7 | 28 | -1 | ... |
|---|---|---|---|---|---|
| FIFTH DIGIT | 1 | 0 | 1 | 0 | ... |
| FOURTH DIGIT | 0 | 1 | 1 | 0 | ... |
| SECOND DIGIT | 0 | 1 | 0 | 0 | ... |
| FIRST DIGIT | 1 | 1 | 0 | 1 | ... |

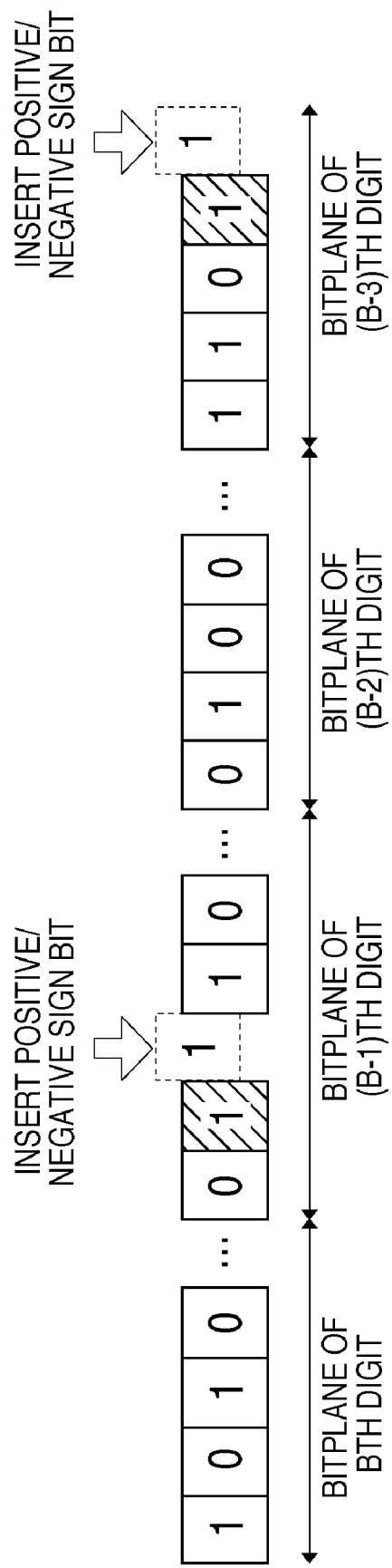

| BLOCK NUMBER | UPPER-BIT PORTION CODE LENGTH | LOWER-BIT PORTION CODE LENGTH |
|---|---|---|
| 0 | Cu(0) | Cl(0) |
| 1 | Cu(1) | Cl(1) |
| 2 | Cu(2) | Cl(2) |
| ... | ... | ... |
| n | Cu(n) | Cl(n) |
| n+1 | Cu(n+1) | Cl(n+1) |
| ... | ... | ... |
| N-1 | Cu(N-1) | Cl(N-1) |

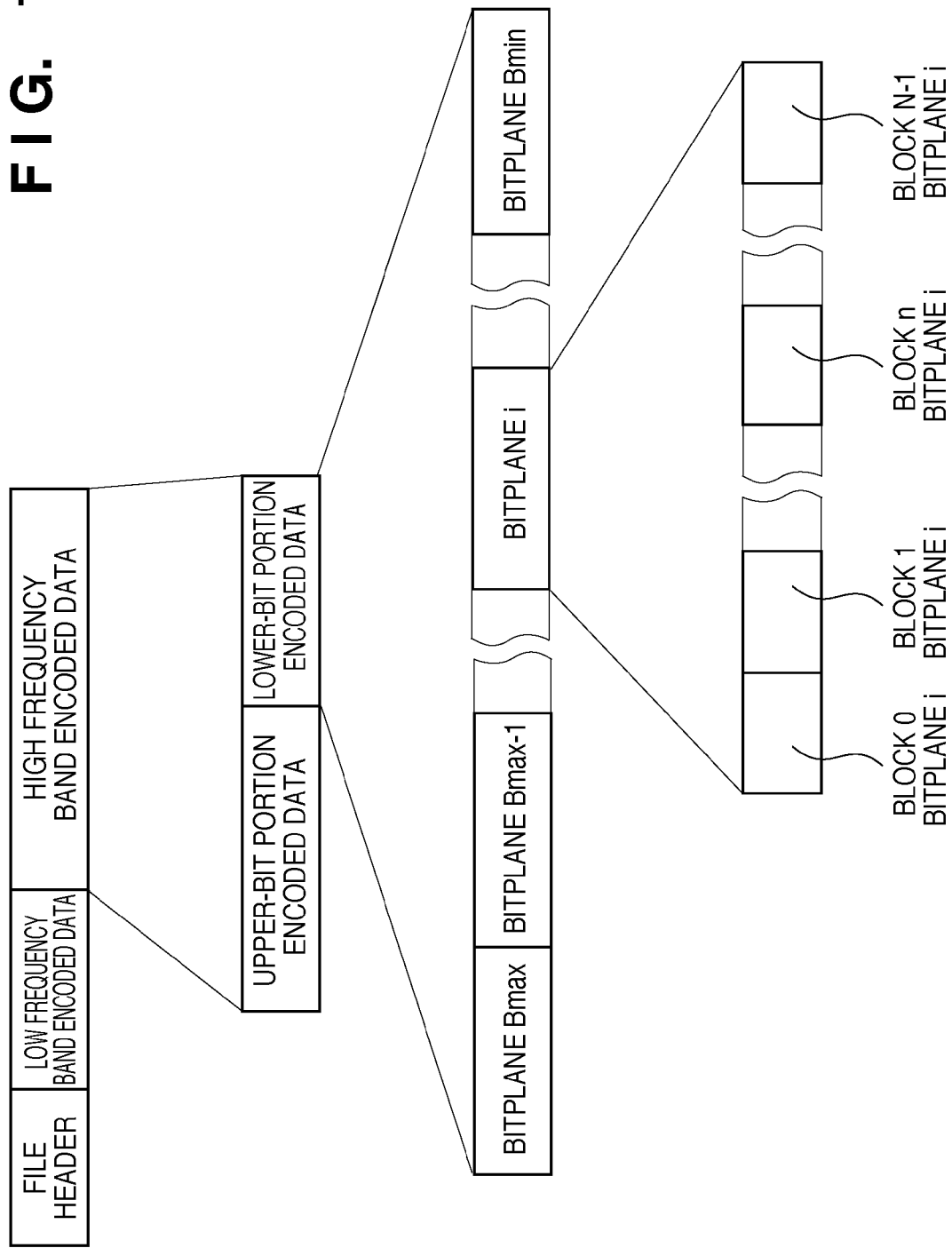

IMAGE ENCODING APPARATUS AND METHOD OF CONTROLLING THE SAME

BACKGROUND OF THE INVENTION

1. Field of the Invention

The present invention relates to an image encoding technique and, more particularly, to a technique of transforming image data into data in the frequency space and encoding obtained transform coefficients, thereby generating encoded image data.

2. Description of the Related Art

As an image coding method, conventionally, transform coding is used which encodes image data by transforming it into data in the frequency space. JPEG which is recommended as the international standard scheme of still image coding is a typical example of transform coding using DCT (Discrete Cosine Transform) as a technique of transforming data into data in the frequency space. The encoding process of JPEG will briefly be described below.

An encoding target image is divided into blocks each formed from a rectangular region. DCT is applied to each pixel in each block. Coefficients obtained by transform are quantized in accordance with a desired image quality level and code amount. The quantized transform coefficients are entropy-encoded. In JPEG Baseline, Huffman coding is employed as the coefficient entropy-coding method. Since one block includes 8×8 pixels (=64 pixels), one DC component value and 63 AC component values are generated by DCT. The DC component value is encoded as the difference value with respect to the immediately preceding block. Each AC component value is Huffman-coded by combining the number of continuous zeros (zero run) and a non-zero coefficient value.

For efficient encoding using the method of encoding the number of continuous zeros, as in JPEG Baseline, the number of coefficient values that are zero after quantization is preferably as large as possible. To do this, the quantization step value to be used in quantization is made large. However, the larger the quantization step value is, the larger the difference between the original image and an image obtained by decoding is. That is, the quality of the image obtained by decoding degrades.

To place priority on the image quality, the quantization step value is preferably as small as possible. In this case, however, no high encoding efficiency is expected.

To raise the encoding efficiency and simultaneously adopt a small quantization step value, a method has been proposed which separates each coefficient value into an upper-bit portion and a lower-bit portion and applies run-length encoding to only the upper-bit portion.

Japanese Patent Laid-Open No. 2000-13797 discloses an example of an image processing apparatus and method using this conventional technique.

When encoding an image, it is sometimes necessary to control the code amount to a predetermined value or less. For example, a digital camera needs to store a predetermined number of image data in a storage medium having a limited capacity. The code amount control is also required for the purpose of reducing the memory utilization in an image encoding apparatus.

As the means for controlling the code amount, various kinds of methods are proposed. A method of repeating quantization step adjustment and encoding processing until the code amount reaches a target value is supposed to be simplest.

As simpler techniques, methods of controlling the code amount by discarding part of generated encoded data are also known, including a method of, e.g., omitting the lower bits of a coefficient.

The above-described code amount control means for adjusting the quantization step to control the code amount to a target value can finely set the quantization step. It is therefore possible to obtain high image quality within a predetermined code amount. However, this method needs high operation cost and long process time for re-encoding.

Re-encoding requires reconstruction of a coefficient value. To hold an image or a coefficient value, a large memory capacity is necessary. To decode a coefficient from temporarily encoded data and re-encode it, an operation cost for the decoding is needed. Additionally, since the value quantized once is quantized again using another quantization step, fine control is impossible.

In the above-described method of discarding part of a code, omitting lower bits is equivalent to processing of limiting selectable quantization steps to multiples of a power of 2. Since fine control is impossible even in this case, the quality of a reproduced image may have a problem.

SUMMARY OF THE INVENTION

The present invention has been made in consideration of the above problems. The present invention provides an encoding technique which makes it possible to reproduce a high-quality image in a short process time using a small memory capacity by image encoding processing of performing frequency transform and quantization of each pixel block.

To solve the above problems, for example, an image encoding apparatus according to the present invention has the following arrangement. That is, there is provided an image encoding apparatus which encodes image data and generates encoded data within a target code amount L, comprising: an input unit which inputs, from encoding target image data, image data of a pixel block including a plurality of pixels; a frequency transform unit which frequency-transforms the input image data of the pixel block to generate high frequency band data and low frequency band data; a storage unit which stores, in a buffer memory, the low frequency band data obtained by the frequency transform unit; a first encoder which quantizes and encodes the high frequency band data obtained by the frequency transform unit and stores obtained encoded data in a code stream storage memory; a detector which detects a total code amount CL_H of the encoded data of the high frequency band data generated by the first encoder; a determiner which, when the first encoder has finished encoding processing of high frequency band data of all pixel blocks of the encoding target image data, sets, as a low frequency band target code amount, a capacity obtained by subtracting the total code amount CL_H of the encoded data of the high frequency band data from the target code amount L and determines an encoding parameter of the low frequency band data based on the low frequency band target code amount; a second encoder which encodes the low frequency band data stored in the buffer memory, in accordance with the encoding parameter determined by the determiner and stores obtained encoded data in the code stream storage memory; and an outputting unit which, when the second encoder has finished encoding processing of low frequency band data of all pixel blocks, outputs the encoded data of the low frequency band data and the encoded data of the high frequency band data both of which are stored in the code stream storage memory and have a data structure in a preset format.

According to the present invention, it is possible to generate encoded data having visually satisfactory quality within a target code amount while reducing the memory and operation costs.

Further features of the present invention will become apparent from the following description of exemplary embodiments with reference to the attached drawings.

BRIEF DESCRIPTION OF THE DRAWINGS

FIG. 7 is a view showing an outline of bit separation of coefficients;

FIG. 8 is a view showing the encoded data of lower bits;

FIG. 15 is a view showing the structure of encoded data output from the image encoding apparatus according to the first embodiment;

DESCRIPTION OF THE EMBODIMENTS

Embodiments of the present invention will now be described in detail with reference to the accompanying drawings.

First Embodiment

Figure 1:
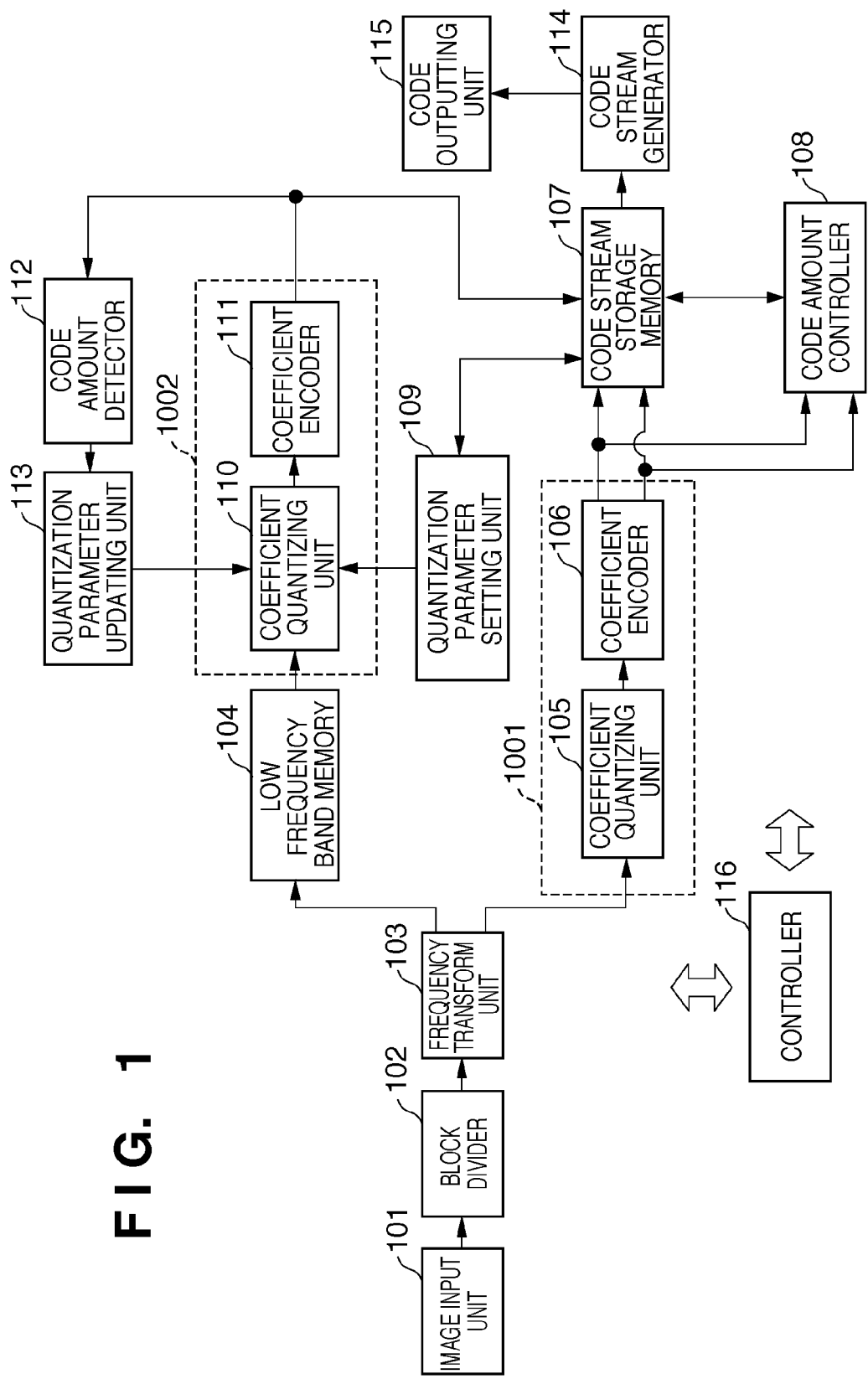
FIG. 1 is a block diagram showing the arrangement of an image encoding apparatus according to the first embodiment.

FIG. 1 is a block diagram showing the arrangement of an image encoding apparatus according to the embodiment.

The image encoding apparatus of the embodiment externally inputs encoding target image data and performs encoding processing for each pixel block, thereby generating a code stream within a predetermined target code amount L. In this embodiment, the target code amount L includes no additional information such as a header. However, the code amount including a header and the like may be adjusted. Note that the image data input source is an image scanner. However, an input source of any other type is applicable, including a storage medium storing image data as a file.

Note that the encoding target image data is monochrome multi-valued image data containing only luminance components. The embodiment will be explained assuming that a luminance component has eight bits (256 tones from 0 to 255) for the sake of simplicity. However, one pixel may contain a plurality of components (e.g., RGB or CMYK). The color space can be of any type. The number of bits of one component need not always be eight and can be exceed eight. The encoding target image is formed from W horizontal pixels and H vertical pixels. W and H are assumed to be integer multiples of 16 for the descriptive convenience.

Encoding processing by the image encoding apparatus shown in FIG. 1 will be described below. A controller 116 controls the operation of the entire image encoding apparatus in FIG. 1. The processors cooperatively operate under the control of the controller 116. The process contents of the processors will be explained below.

An image input unit 101 sequentially inputs encoding target image data. The pixel data input order is the raster scan order. The value of one pixel is eight bits and is represented by a non-negative integer value within the range of 0 to 255. The upper left corner of the image is represented by coordinates (0,0). The value of a pixel located at a pixel position x rightward in the horizontal direction and a pixel position y downward in the vertical direction is represented by P(x,y). For example, when a pixel at a position (x,y)=(3,4) has a luminance value of 128, it is expressed by P(3,4)=128. In the following description, "P(x,y)" is also used to express a "pixel" at the position (x,y).

A block divider 102 stores, in an internal buffer (not shown), the pixel data supplied from the image input unit 101 as needed. The block divider 102 sequentially outputs image data of each rectangular block formed from a plurality of pixels (16×16 pixels in this embodiment). The rectangular block of 16×16 pixels will be referred to as a pixel block hereinafter. The block divider 102 thus outputs each pixel block. In this embodiment, the pixel block at the upper left corner of the image is assigned an identification number "0". The identification number is assigned in ascending order of raster scan, thereby specifying one pixel block. Hence, the ith pixel block is represented by MB(i). Letting N be the total number of pixel blocks, N=W/16×H/16. That is, the variable i can take a value within the range of [0, 1, 2, . . . , W/16×H/16−1].

A frequency transform unit 103 stores, in an internal buffer (not shown), the data of the pixel blocks (to be simply referred to as pixel block data hereinafter) output from the block divider 102 and performs frequency transform. As the frequency transform processing, Hadamard transform for every 4×4 pixels is used here. However, any other transform to separate pixel block data into frequency components is usable. Discrete cosine transform may be used in another embodiment. A rectangular block of partial image data including 4×4 pixels, which is the target of frequency transform (Hadamard transform in this embodiment), will be referred to as a sub-pixel block hereinafter.

Figure 2:
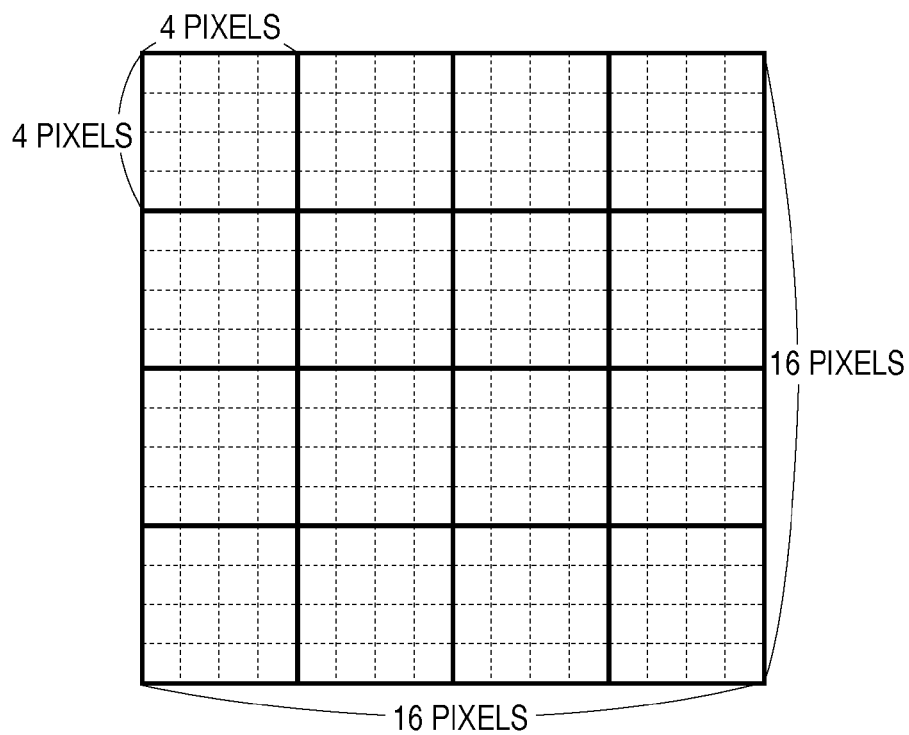
FIG. 2 is a view showing the relationship between a block and sub-pixel blocks as a unit of encoding processing.

FIG. 2 shows the relationship between the pixel block MB(i) having a size of 16×16 pixels and extracted by the block divider 102 and sub-pixel blocks. As shown in FIG. 2, one pixel block includes 16 (=4×4) sub-pixel blocks.

The frequency transform unit 103 performs the frequency transform processing in two stages. Each stage will be described below.

[First Stage (First Frequency Transform)]

Figure 3:
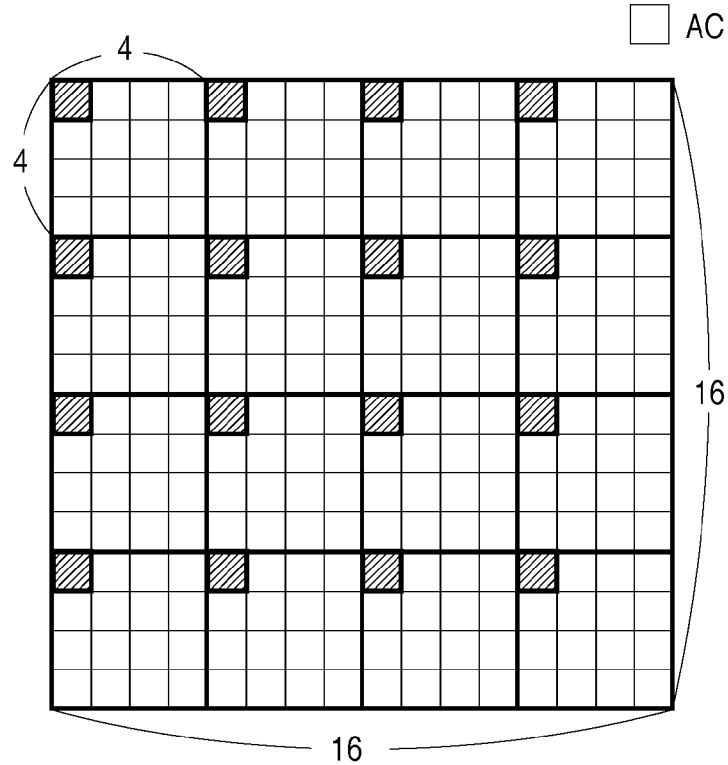
FIG. 3 is a view showing DC components and AC components obtained by frequency transform of 16 sub-pixel blocks included in a block.

The frequency transform unit 103 executes two-dimensional Hadamard transform for each of the 16 sub-pixel blocks, thereby generating one DC coefficient and 15 AC coefficients per sub-pixel block. FIG. 3 shows an outline of 256 coefficients obtained by applying Hadamard transform to the sub-pixel blocks in the pixel block MB(i) 4×4 times. In FIG. 3, hatched regions represent the DC coefficient values of the sub-pixel blocks, and white regions represent AC coefficient values. As shown in FIG. 3, since one pixel block includes 16 sub-pixel blocks, 16 (=4×4) DC coefficient values and 240 (=16×16−16) AC coefficient values are obtained from one pixel block. The 240 AC coefficient values obtained by this transform are supplied to a coefficient quantizing unit 105. The 16 DC coefficient values are used for Hadamard transform of the second stage to be described next.

[Second Stage (Second Frequency Transform)]

Figures 4, 5:
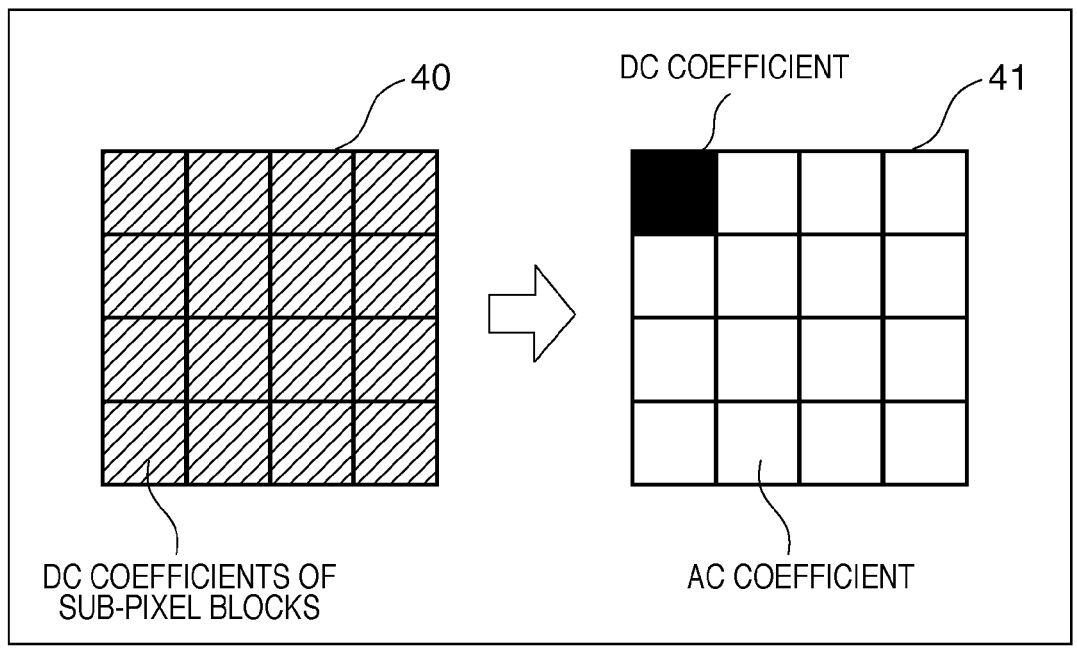
FIG. 4 is a view showing 4×4 DC components collected from the sub-pixel blocks and a result obtained by performing frequency transform again for the DC components.
FIG. 5 is a view showing the identification number of AC coefficients.

The frequency transform unit 103 collects the DC coefficients of the sub-pixel blocks to create a new DC block 40 which is formed from 4×4 DC coefficients, as shown in FIG. 4. The frequency transform unit 103 performs Hadamard transform again for the DC block 40, thereby obtaining transform coefficient data 41 in FIG. 4, which includes one DC coefficient (represented by a black region in FIG. 4) and 15 AC coefficients. To discriminate between the DC coefficient and AC coefficients obtained at the second stage and those obtained at the first stage, the DC coefficient and AC coefficients obtained at the second stage will be referred to as a DCDC coefficient DCAC coefficients.

In encoding processing according to this embodiment, the coefficients generated by the frequency transform unit 103 are roughly divided into two groups and processed. One is the transform coefficient data 41 including one DCDC coefficient and 15 DCAC coefficients obtained by the processing at the second stage. These data will collectively be referred to as low frequency band data hereinafter. The other is the data including the 240 AC coefficients except the DC coefficients obtained by the processing at the first stage. These data will collectively be referred to as high frequency band data hereinafter.

The frequency transform unit 103 stores the low frequency band data in a low frequency band memory 104 functioning as a buffer memory and outputs the high frequency band data to the coefficient quantizing unit 105.

In the embodiment, the encoding processing of the low frequency band data starts after the high frequency band data of the encoding target image data has been encoded. For this purpose, the low frequency band data is temporarily stored in the low frequency band memory 104.

The encoding processing of the high frequency band data will be described below, and the encoding processing of the low frequency band data will then be described.

[Encoding of High Frequency Band Data]

Using quantization steps set for the respective frequency bands in advance, the coefficient quantizing unit 105 quantizes the high frequency band data (the 240 AC coefficients at the first stage) obtained by the frequency transform unit 103.

The high frequency band data of one sub-pixel block is formed from 15 AC coefficients of different bands, as shown in FIG. 5. A quantization step value is set for each of the 15 bands. Values at which the code amount approximates to a preset target code amount L, and a decoded image has image quality within a tolerance are determined using several sample images and applied as the quantization step values.

Setting the quantization step values is related to the execution frequency of code amount reduction processing to be described later. For example, if the quantization step is adjusted to make the code amount smaller than the target code amount L, the probability that the code amount reduction processing will be executed is low, though the high frequency band may be removed more than necessary (speed-oriented). On the other hand, if the quantization step is adjusted to make the code amount larger than the target code amount L, the probability that the code amount reduction processing will be executed is high, though the high frequency band data are left as much as possible (image quality-oriented). The quantization steps are thus set in accordance with the use form.

The coefficient quantizing unit 105 outputs the coefficient values as the quantization result of the high frequency band data to a coefficient encoder 106. If it is not particularly necessary to discriminate the presence/absence of quantization, a quantized coefficient value will simply be referred to as a coefficient value hereinafter. This embodiment will be explained assuming that one coefficient value is expressed by nine bits (of which one bit is a positive/negative sign). The number of bits may be 10 or more to increase the accuracy.

The coefficient encoder 106 encodes the 240 quantized coefficient values of the high frequency band data from the coefficient quantizing unit 105. More specifically, the coefficient encoder 106 separates one coefficient value (nine bits) into an upper-bit portion on the upper side of a bit position represented by a boundary bit B and a lower-bit portion on the lower side from the boundary bit B, and applies encoding of the number of continuous zeros, i.e., run-length encoding to the upper-bit portion. A code stream storage memory 107 sequentially stores generated code streams. The boundary bit-position B represented by boundary bit-position information to be used to separate a coefficient value into an upper-bit portion and a lower-bit portion is set as an initial value at the start of image encoding. The coefficient encoder 106 updates the bit position of the boundary bit-position B every time one pixel block is encoded.

Note that a decoding apparatus also sets the same initial boundary bit-position B as in the encoding apparatus at the start of decoding and uses the same update algorithm as in the encoding apparatus for the boundary bit-position B in decoding. Consequently, it is unnecessary to store, in a finally obtained encoded data file, information about the boundary bit-position B.

The processing of the coefficient encoder 106 and the update algorithm of the boundary bit-position B will be described below.

Figure 6:
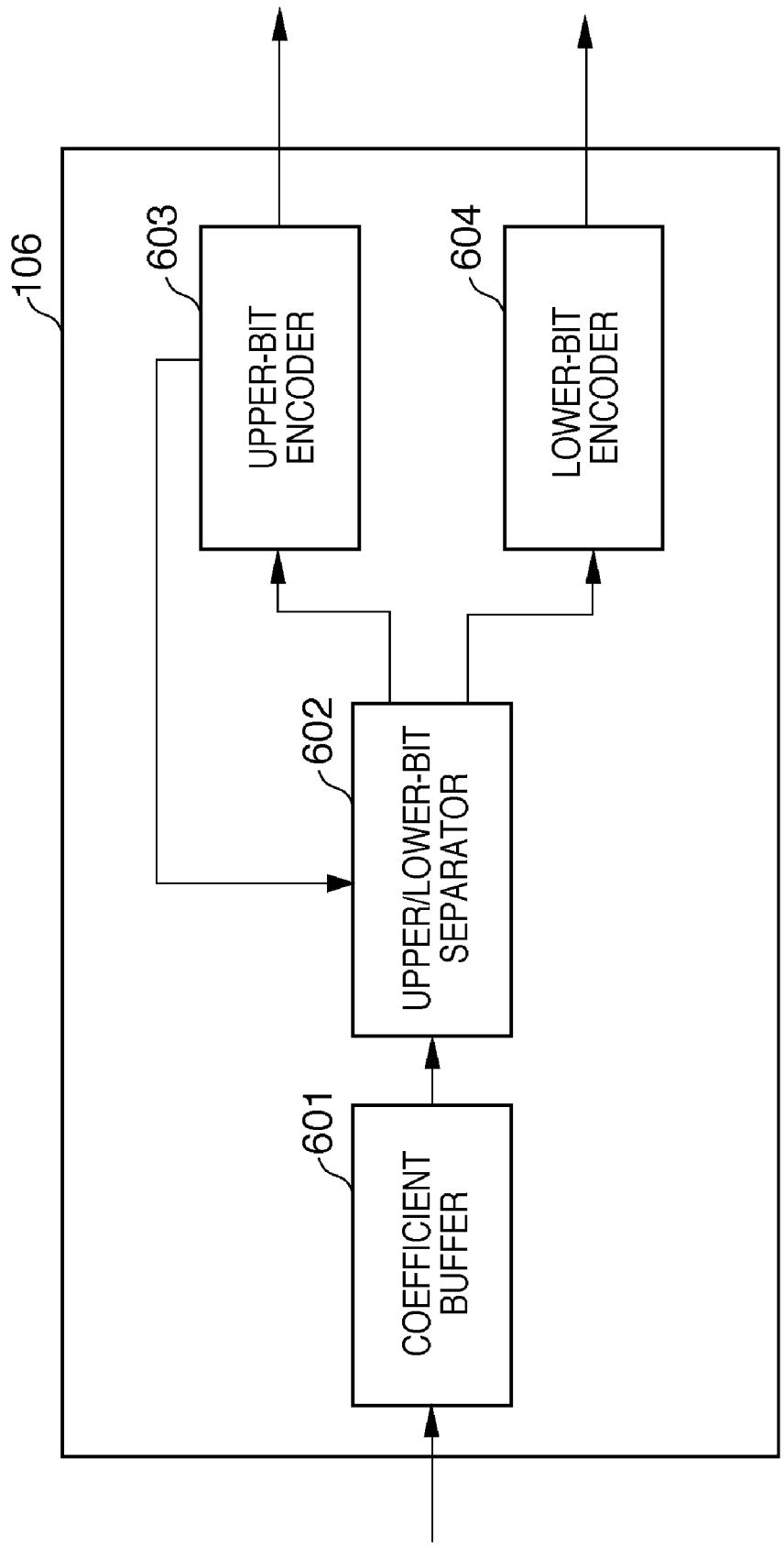
FIG. 6 is a block diagram showing the internal structure of a coefficient encoder 106.

FIG. 6 is a block diagram showing the arrangement of the coefficient encoder 106. The coefficient encoder 106 includes a coefficient buffer 601, upper/lower-bit separator 602, upper-bit encoder 603, and lower-bit encoder 604. The processing of the coefficient encoder 106 will be explained below with reference to FIG. 6.

The 240 quantized efficient values of the high frequency band data input to the coefficient encoder 106 are temporarily stored in the coefficient buffer 601.

The upper/lower-bit separator 602 reads out the coefficient values from the coefficient buffer 601 in a predetermined order and separates each coefficient value into an upper-bit portion on the upper side of the boundary bit-position B in the code absolute value notation and a lower-bit portion on the lower side from the boundary bit B. The positive/negative sign bit is excluded from the process target. The coefficient value readout order can be arbitrary. In this embodiment, 16 sub-pixel blocks of the pixel block MB(i) are read out in the raster scan order. Quantized coefficient values (AC coefficient values) in one sub-pixel block are read out in a zigzag scan order. However, any other order is applicable if it is common to the decoding apparatus.

The upper-bit encoder 603 at the succeeding stage encodes the upper-bit portion of the coefficient by combining the number of continuous zeros and a non-zero coefficient value (to be described later in detail). At this time, a scan order that prolongs the number of continuous zeros is preferable. For example, an appropriate method may be selected from several scan patterns. Alternatively, the scan order may dynamically be changed in descending order of coefficient power by referring to the coefficient distribution in a block encoded in the past.

Let $C_n$ be an nth ($1 \leq n \leq 15$) coefficient value in a sub-pixel block of interest. The upper/lower-bit separator 602 obtains an upper-bit portion $U_n$ (=$C_n$>>B) and a lower-bit portion $L_n$ (=$|C_n|$ & ((1<<B)−1)). "Y>>X" represents shifting a value Y to the lower side by X bits, and "Y<<X" represents shifting the value Y to the upper side by X bits. |Y| represents the absolute value of the value Y, and X&Y represents the AND of a value X and the vale Y for each bit.

The upper/lower-bit separator 602 outputs the upper-bit portion $U_n$ on the upper side of the boundary bit-position of the coefficient value $C_n$ of interest to the upper-bit encoder 603, and the lower-bit portion $L_n$ on the lower side from the boundary bit-position to the lower-bit encoder 604.

Note that for the coefficient $C_n$ in which the value of the upper-bit portion $U_n$ except the positive/negative sign bit is "0", the sign representing the positive/negative value of the coefficient $C_n$ is also transferred to the lower-bit encoder 604.

FIG. 7 shows an example in which "−41, −7, 28, −1, . . . " are input as examples of the coefficient value $C_n$ and separated into the upper-bit portions $U_n$ and the lower-bit portions $L_n$ at the boundary bit-position B=4.

In FIG. 7, the upper/lower-bit separator 602 outputs 15 upper-bit portions $U_n$ each including one positive/negative sign bit to the upper-bit encoder 603 for one sub-pixel block.

If the value represented by the four bits of the input upper-bit portion $U_n$ except the positive/negative sign bit is "0", the upper-bit encoder 603 does not encode the positive/negative sign bit. In the example of FIG. 7, the value represented by the four bits of the input upper-bit portion $U_n$ except the positive/negative sign bit becomes "0" in the coefficient values $C_n$="−7" and "−1". If the value represented by the four bits of the input upper-bit portion $U_n$ except the positive/negative sign bit is non-zero, the upper-bit portion $U_n$ including the positive/negative sign bit is directly encoded by run-length encoding.

Hence, in the case shown in FIG. 7, the upper-bit encoder 603 performs run-length encoding in the order of multi-valued data "−2", "0", "1", "0", . . . of decimal notation. As a result, the probability that the upper-bit portion will be "0" rises. This increases the encoding efficiency.

The encoding processing of the upper bits of AC coefficient values in one sub-pixel block has been described above. Since a pixel block of interest includes 4×4 sub-pixel blocks, the above-described processing is executed 4×4 times.

The upper-bit encoder 603 of this embodiment performs encoding using the same method as in AC coefficient encoding of JPEG Baseline. More specifically, each of the upper-bit portions $U_n$ (15 upper-bit portions) of AC coefficients in a sub-pixel block of interest is Huffman-coded by combining the number of continuous zeros and a non-zero coefficient value. If a sub-pixel block ends with continuous zeros, a special code representing EOB (End Of Block) is used, as in JPEG Baseline. Details of the AC coefficient encoding method of JPEG Baseline are described in the following international standard recommendation and the like, and a description thereof will be omitted here. "ITU-T Recommendation T.81|ISO/IEC 10918-1:1994, Information technology—Digital compression and coding of continuous-tone still images: Requirements and guidelines".

The upper-bit encoder 603 counts the number NZ of coefficient values whose upper-bit portions have a value "0" while encoding the upper-bit portions. This counting is done in each pixel block (not a sub-pixel block). NZ=0 is set at the start of encoding of one pixel block. The counter is incremented every time 0 is input as $U_n$. When encoding of one pixel block has ended, the value NZ is checked. If NZ is equal to or smaller than a predetermined threshold Th, the value of the boundary bit-position B is incremented by one. That is, the bit position of the boundary bit-position B is updated by one to the upper side. To the contrary, if NZ>Th, the value of the boundary bit-position is decremented by one. The boundary bit-position B takes a value within the range of 0 to 8. For example, when the updated value is −1, the value returns to 0. Using the thus updated boundary bit-position B, the boundary bit-position of the AC coefficient value of the next pixel block is determined.

On the other hand, the upper/lower-bit separator 602 outputs the 240 lower-bit portions $L_n$ ($1 \leq n \leq 240$) of the block of interest to the lower-bit encoder 604. As described above, for the coefficient $C_n$ in which the value of the upper-bit portion $U_n$ represented by the four bits except the positive/negative sign bit is "0", the upper/lower-bit separator 602 adds the positive/negative sign bit to the lower-bit portion $L_n$ and outputs it to the lower-bit encoder 604.

In the example of FIG. 7, the value of the input upper-bit portion $U_n$ except the positive/negative sign bit becomes "0" in the coefficient values "−7" and "−1". Hence, the positive/negative sign bit adding position is the position where first "1" appears from the upper side to the lower side of the lower-bit portion $L_n$. In the example of FIG. 7, the positive/negative bit is inserted at the position represented by a hatched portion.

The lower-bit encoder 604 encodes the lower-bit portion $L_n$ output from the upper/lower-bit separator 602. The lower-bit portion $L_n$ is generally data hard to compress, as compared to the upper-bit portion $U_n$. Hence, the lower-bit encoder 604 outputs an uncompressed lower-bit portion. Basically, input data directly becomes encoded data because it is uncompressed. However, bit data is arranged in accordance with the degree of influence on the image quality. More specifically, to facilitate code amount adjustment by deleting lower bitplanes as needed, the lower-bit encoder 604 outputs the data in the order of bitplane.

In the case shown in FIG. 7, the lower-bit encoder 604 stores the received lower-bit portion $L_n$ ($1 \leq n \leq 240$) in an internal buffer (not shown) and first outputs a bitplane including the uppermost bit digit (Bth digit) of the lower-bit portions $L_n$. The lower-bit encoder 604 repeats the processing up to the lowermost bit digit (first digit).

When a code amount controller 108 has already executed code amount control processing to determine the lower-bit position of the bitplane to be stored in the code stream storage memory 107, the controller 116 inhibits the coefficient encoder 106 from outputting planes of digits on the lower side of the lower-bit position. That is, when the lower-bit position has been determined, the code stream storage memory 107 does not store bitplanes on the lower side of the lower-bit position. For example, the lower-bit position held in the code stream storage memory 107 is Bmin, a code length Cl(i)=0 (for i<Bmin) is set for the digits on the lower side of Bmin. The code stream storage memory 107 does not store bitplanes on the lower side of Bmin.

FIG. 8 shows an example of data output from the lower-bit encoder 604 for the coefficient value stream "−41, −7, 28, −1, . . ." (boundary bit-position B=4) shown in FIG. 7.

The plane (pieces of bit information at the same bit position) output first in the lower-bit portions Ln is a Bth-digit bitplane "1010 . . ." The coefficient values "−41" and "28" correspond to "1". The values represented by the upper-bit portions Un of the coefficient values "−41" and "28" except the sign bits are non-zero. Hence, no positive/negative sign bit is inserted.

The first "1" bit representing the coefficient value "−7" appears in the next (B−1)th-digit bitplane (FIG. 7). The value of the upper-bit portion Un of the coefficient value "−7" except the positive/negative sign bit is "0". Hence, as shown in FIG. 8, the positive/negative sign bit is inserted at the position following the first "1" representing the coefficient value "−7". The (B−2)th- and (B−3)th-digit bitplanes are sequentially output. In the (B−3)th-digit bitplane, first "1" representing the coefficient value "−1" appears. Hence, the positive/negative sign bit is inserted at the position next to it.

With the above-described processing, the coefficient encoder 106 generates two code streams, i.e., a code stream corresponding to the upper-bit portions and a code stream corresponding to the lower-bit portions, and stores them in the code stream storage memory 107. The code stream storage memory 107 will be referred to as the memory 107 in abbreviated form hereinafter. The memory 107 has at least a memory capacity corresponding to the target code amount L. The memory 107 has two areas. A capacity corresponding to α times (0<α<1.0) of the target code amount L (allowable code amount of the high frequency band) is allocated to one area in the high frequency band encoding processing. The remaining area (the area having a capacity of L×(1−α)) is allocated to store encoded data generated by low frequency band encoding processing (to be described later).

Figure 9A:
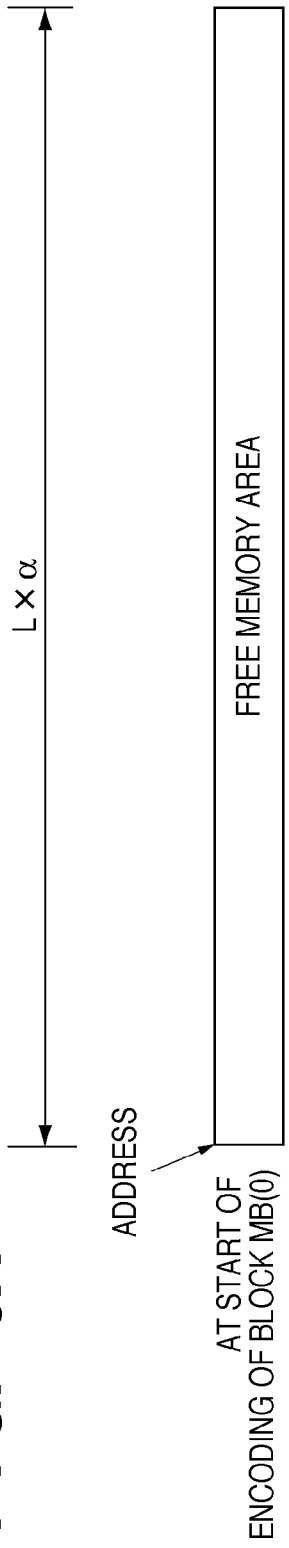
FIGS. 9A and 9B are views showing an area of a code stream storage memory 107 to store the encoded data of high frequency band data and the storage state of the encoded data.

FIG. 9A is a view showing an L×α (α<1.0) area of the memory 107 allocated for high frequency bands at the start of image encoding. At the start of encoding, the area stores no data, and its full capacity is usable. The multiplier α serves as a guide for the occupation ratio of the code amount of high frequency band data in the target code amount L, and also determines the memory capacity necessary for storing the high frequency band data. The multiplier α is set by, e.g., adjusting the quantization steps to obtain visually satisfactory decoding quality within the target code amount L and calculating the average of the occupation ratios of the code amount of high frequency band using several sample images. For example, if the ratio of the code amount of high frequency band data obtained in this way is 6, α is set to 0.6. A capacity L×0.6 is allocated as the encoded data storage area for high frequency band data in the code stream storage memory 107.

The two code streams (the encoded data of the upper-bit portion and the lower-bit portion) output from the coefficient encoder 106 are separately stored from the start and end of the memory 107. As described above, the code amount of the uncompressed lower-bit portion is definite after the upper/lower-bit separation has been performed. It is therefore possible to calculate the address to start storing the code stream, and it is easy to store data from the end of the memory, as is understandable. For example, let ADR(i) be the address to start storing a code stream corresponding to the lower-bit portion of the ith pixel block MB(i). When the code amount of the lower-bit portion of the pixel block MB(i) is Cl(i), $$ADR(i)=L\times\alpha-Cl(i) \ldots \text{when } i=0$$

$$ADR(i)=ADR(i-1)-Cl(i) \ldots \text{when } i\neq 0$$

The address to start storage is thus determined, and the lower-bit encoded data of the pixel block MB(i) is stored from that address. In this example, the start address of the memory 107 is set to 0.

Figures 11, 12:
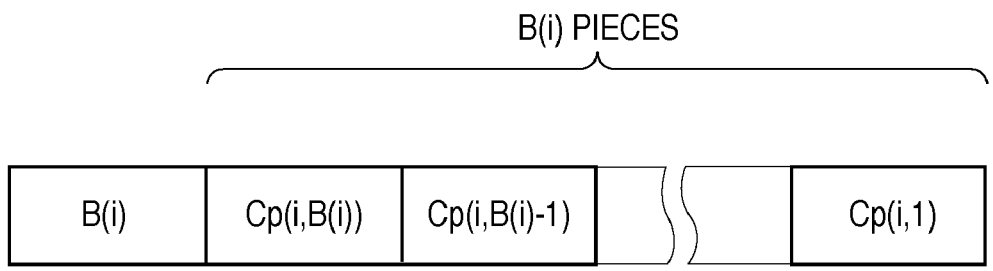
FIG. 11 is a view showing an outline of information about the code length of each block held in the code amount controller 108.
FIG. 12 is a view showing an outline of information about the code length of lower bits held in the code amount controller 108.

Note that the code amount controller 108 holds lengths Cu(i) and Cl(i) of the code streams corresponding to the upper-bit portion and the lower-bit portion of each pixel block. FIG. 11 shows information about the code lengths of pixel blocks held and managed by the code amount controller 108 when encoding has ended up to an nth pixel block MB(n). Portions (hatched portions) from the (n+1)th block have no values yet at this point of time.

The code amount controller 108 also holds lower-bit portion code length information including the boundary bit-position of each pixel block and the code length of each bitplane. For the pixel block MB(i), the boundary bit-position is represented by B(i), and the code length of bth-digit (1≦b≦B(i)) plane is represented by Cp(i,b). FIG. 12 shows lower-bit portion code length information stored per block.

Figure 9B:
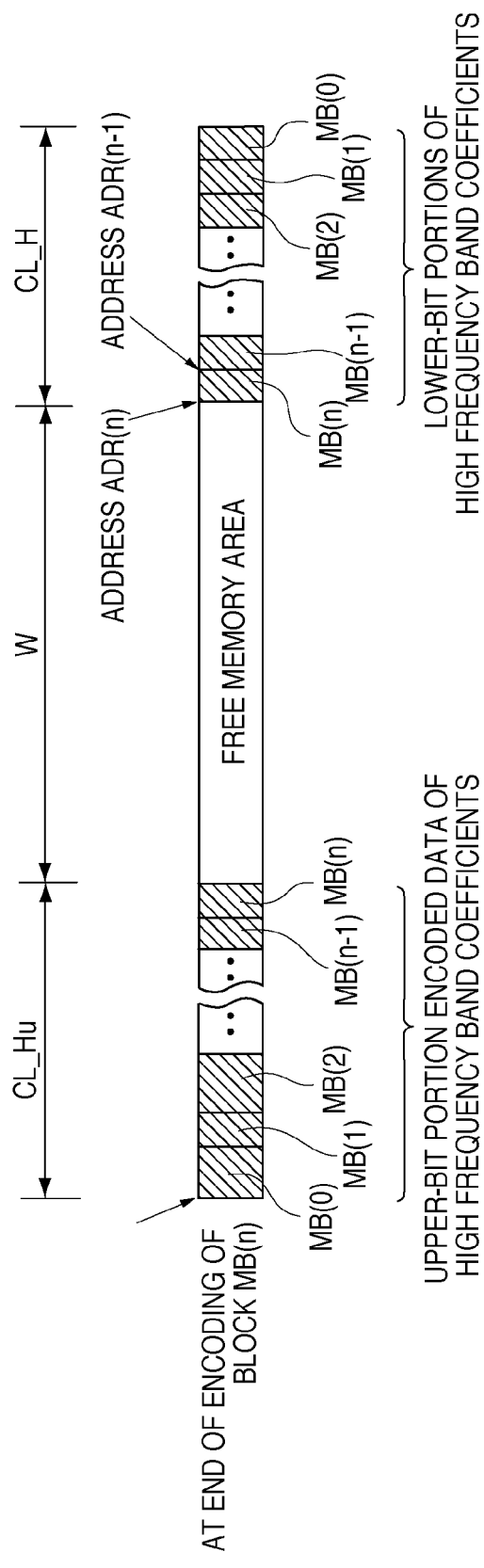

FIG. 9B illustrates the state of the memory 107 when encoding has ended up to the nth pixel block MB(n). As shown in FIG. 9B, code streams corresponding to the upper-bit portions of coefficients in the high frequency bands are stored from the start address of the memory 107 sequentially from a block MB(0) to the block MB (n). On the other hand, code streams corresponding to the lower-bit portions are stored from the end address of the memory 107 toward the start address.

The code amount controller 108 monitors a free memory area W of the memory 107 and compares it with a worst code length BL of one pixel block. If W<BL, the code amount controller 108 reduces the code amount to be stored in the memory 107. Let $CL\_H_u$ be the capacity of upper-bit portion encoded data stored in the memory 107 at the end of encoding of the nth block, and $CL\_H_l$ be the capacity of lower-bit portion encoded data.

$$CL\_H_u=\Sigma Cu(i) (\text{for } i=0,1,2,\ldots,n)$$

$$CL\_H_l=\Sigma Cl(i) (\text{for } i=0,1,2,\ldots,n)$$

Letting CL_H be the total code amount, the free memory area W is given by $$W=L\times\alpha-CL\_H=L\times\alpha-(CL\_H_u+CL\_H_l)$$

Figure 10A:
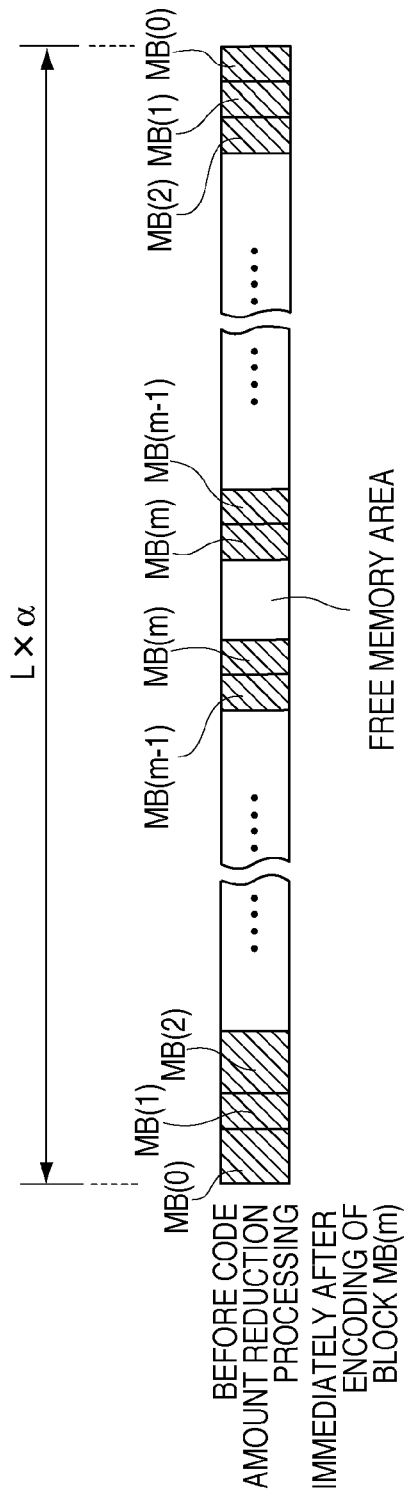
FIGS. 10A and 10B are views showing how a code amount controller 108 decreases the amount of code to be stored in the code stream storage memory 107.

FIG. 10A illustrates a state in which the free memory area W has become smaller than the worst code length BL of a block after encoding an mth pixel block MB(m). In this case, if the block MB(m) is not the final block of the image (m≠N−1), the code amount controller 108 deletes the encoded data of the lower-bit portion, thereby increasing the free memory area.

Figure 13:
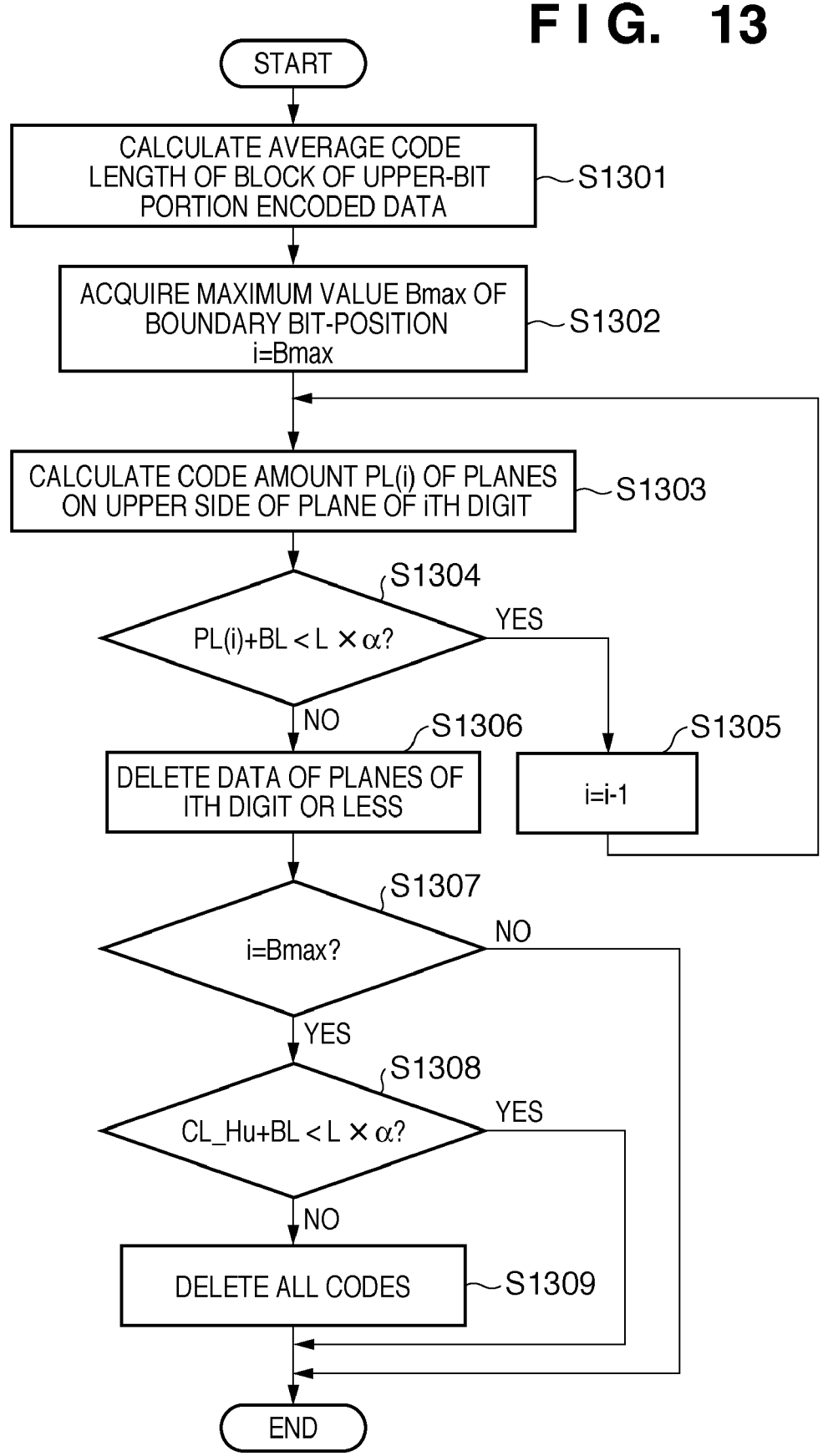
FIG. 13 is a flowchart illustrating the procedure of processing of the code amount controller 108.

FIG. 13 is a flowchart illustrating the procedure of code amount reduction processing executed by the code amount controller 108 when W<BL upon encoding of the mth pixel block. The procedure of code amount reduction processing of the code amount controller 108 will be described below with reference to FIG. 13. As is apparent from the following explanation, bitplanes are deleted in accordance with the priority order from the lower side to the upper side of the bitplane.

First, the code amount controller 108 calculates the average code amount (average code length) of upper-bit portion encoded data per pixel block, which is to be stored in the memory 107 (step S1301). This calculation is done by dividing $CL\_H_u$ by the number (m+1) of already encoded blocks.

Next, the code amount controller 108 acquires a maximum value Bmax of the boundary bit-position in each pixel block by referring to the lower-bit portion code length information held in it, and stores the maximum value Bmax in the variable i (step S1302).

The code amount controller 108 then calculates an estimated code amount PL(i) of the planes on the upper side of the plane of the ith digit (the plane of the ith digit is not included). The estimated code amount is the final code amount of the high frequency band data of the encoding target image data, which is predicted based on the average code amount of the encoded pixel blocks. If i=Bmax, PL(i) is a code amount estimated when the high frequency band data includes only the upper-bit portions. The estimated code amount PL(i) is given by $$PL(i) = CL\_H_u/(m+1) \times N \text{ (when } i=B\text{max)}$$

If i≠Bmax (when i<Bmax), PL(i) is a code amount estimated when the high frequency band data includes the encoded data of the upper-bit portions and the planes of (i+1)th digit or more of the lower-bit portions. Letting S(i) be the average code length of the ith-digit plane, PL(i) is obtained by $$S(i) = \Sigma Cp(j,i)/(m+1) \text{ } (j=0 \text{ to } m)$$

$$PL(i) = PL(i+1) + S(i+1) \times N \text{ (when } i \neq B\text{max)}$$

The code amount controller 108 determines whether PL(i)+BL is smaller than the capacity (L×α) of the memory 107 (step S1304). BL is the worst code length of one block. Comparing the memory capacity with the sum of PL(i) and BL guarantees to store encoded data of at least one block after code amount reduction. If PL(i)+BL<L×α, the code amount controller 108 decrements the variable i (step S1305), and the process returns to step S1303. Otherwise, the process advances to step S1306.

Figure 10B:
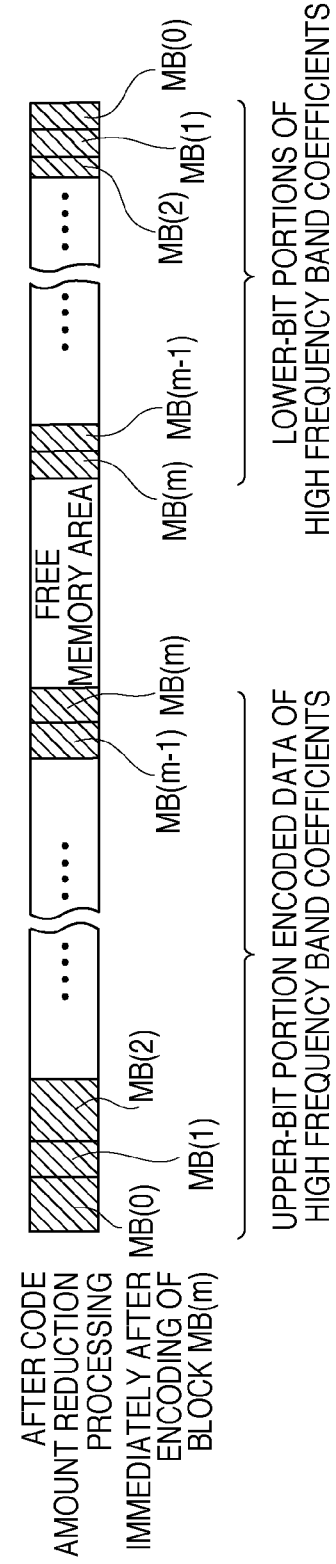

In step S1306, the code amount controller 108 deletes the planes of ith digit or less from the memory 107 and rearranges the code streams of the lower-bit portions. As is understandable, it is possible to delete the information of a predetermined plane by referring to the lower-bit portion code length information held in the code amount controller. FIG. 10B shows a state after code amount reduction by deleting the planes of ith digit or less. At this time, the code amount controller 108 also updates the power-bit portion code length Cl(i) of each block shown in FIG. 11 simultaneously with code amount reduction. Note that when the data of the lower planes of ith digit or less are deleted, the code amount controller 108 holds "i+1" in a variable Bmin (lower-bit position) as the number of the least significant plane stored in the memory 107.

In step S1307, the code amount controller 108 determines whether the variable i=Bmax. If i=Bmax, the process advances to step S1308. Otherwise, the code amount reduction processing ends.

If i=Bmax, i.e., if the high frequency band data includes only the encoded data of the upper-bit portions, the code amount controller 108 adds BL to the current total code amount $CL\_H_u$ of the upper-bit portions and compares it with the memory capacity L×α (step S1308). At this time, the code amount controller 108 determines whether the free space is equal to or more than BL when only the encoded data of the upper-bit portions remains in the memory 107. If $CL\_H_u$+BL<L×α, the processing ends. If $CL\_H_u$+BL≧L×α, i.e., if the free space is smaller than BL, the process advances to step S1309.

In step S1309, the code amount controller 108 deletes all high frequency band data stored in the memory 107. Discarding all high frequency band data lowers the resolution. This processing is applied to avoid memory failures. The quantization steps of the coefficient quantizing unit 105 need to be set to avoid such a state as much as possible.

The above-described processing allows to always allocate, in the memory 107, at least a free area equal to or larger than the worst code length BL of one block before the encoding target reaches the final pixel block. The code stream storage memory 107 stores the encoded data of the high frequency band of all pixel blocks included in the encoding target image data via the operations of the coefficient quantizing unit 105, coefficient encoder 106, and code amount controller 108. Note that the coefficient quantizing unit 105 and the coefficient encoder 106 form a first encoder 1001 of the present invention.

[Encoding of Low Frequency Band Data]

A coefficient quantizing unit 110 and a coefficient encoder 111 to be described below form a second encoder 1002 of the present invention. The coefficient quantizing unit 110 performs quantization in accordance with an encoding parameter set by a quantization parameter setting unit 109 and a quantization parameter updating unit 113 (to be described later in detail).

When the encoding processing of the high frequency band data of the encoding target image data has been completed in the above-described way, the controller 116 controls the coefficient quantizing unit 110, the coefficient encoder 111, and a code amount detector 112 to start encoding processing of low frequency band data. At this time, the controller 116 sets, in the code amount detector 112, a value (corresponding to a low frequency band target code amount to be described later) obtained by subtracting the total encoded data amount CL_H of the high frequency band data stored in the code stream storage memory 107 from the target code amount L.

Note that at the start of encoding of the low frequency band data, the low frequency band memory 104 has already stored the low frequency band data (FIG. 4) of all the pixel blocks MB(0) to MB(N−1) of the encoding target image data. N represents the total number of pixel blocks. Additionally, note that the code stream storage memory 107 has already stored the encoded data of the high frequency band data, and the final encoded data amount CL_H is also definite.

As described above, the area (the capacity is L×α) to store the encoded data of the high frequency band data is allocated in the code stream storage memory 107. However, the capacity and the actual code amount CL_H of the high frequency band data hold a relationship CL_H≦L×α. In other words, the memory area allocated to store the encoded data of the high frequency band data still has the free space W (=L×α−CL_H).

In this embodiment, the low frequency band data is encoded while determining, as areas capable of storing the low frequency band data, the area allocated as L×(1−α) in the code stream storage memory 107 and the free space W in the area where the encoded data of the high frequency band data has been stored. "L×(1−α)+W" is the allowable code amount of the encoded data of the low frequency band data. "L×(1−α)+W" will be referred to as a low frequency band target code amount L' hereinafter. This is information set in the code amount detector 112, as described above.

The encoding processing of the low frequency band data according to the embodiment will be described below.

A quantization parameter setting unit 109 sets, in the coefficient quantizing unit 110, a default quantization parameter q determined based on the low frequency band target code amount L'.

Figure 18:
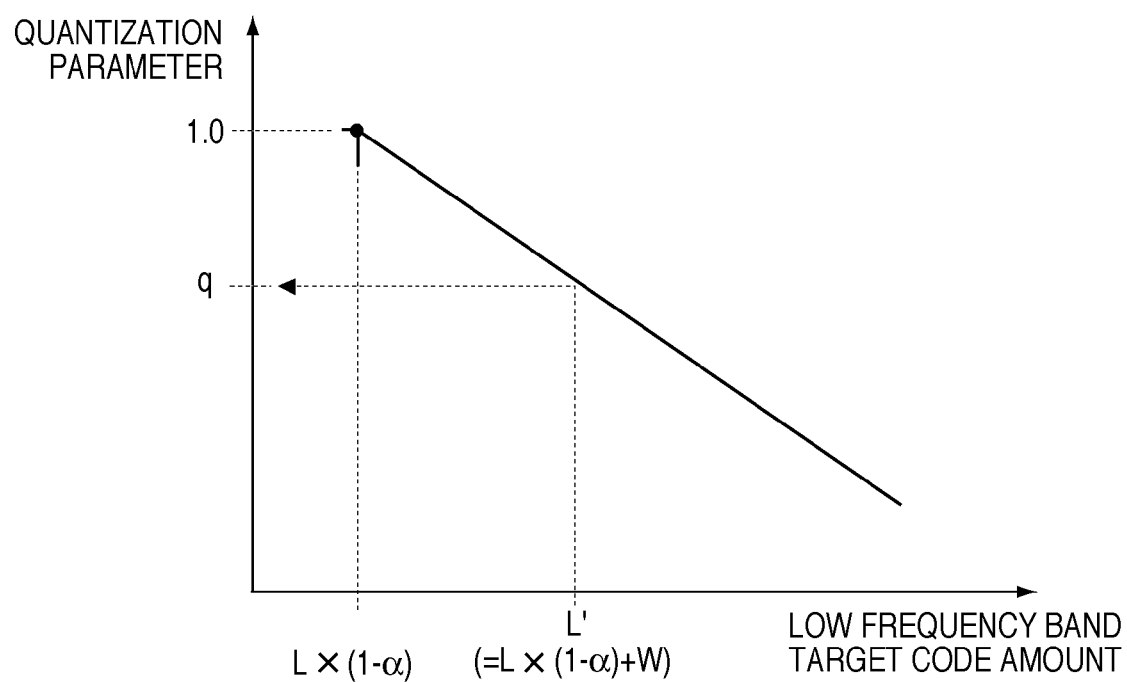
FIG. 18 is a view showing the correlation between a low frequency band target code amount and an encoding parameter according to the first embodiment.

The present inventor checked the relationship between the low frequency band target code amount L' and the quantization parameter in several sample images in advance and created a lookup table shown in FIG. 18, which associates the low frequency band target code amounts L' with quantization parameters. A memory (not shown) in the quantization parameter setting unit 109 stored the table. The quantization parameter setting unit 109 determined the quantization parameter q based on the low frequency band target code amount L' by looking up the lookup table in FIG. 18.

The quantization parameter q is "1.0" when the free space in the code stream storage memory 107 is $L \times (1-\alpha)$. The larger W is, the smaller the quantization parameter q is.

The coefficient quantizing unit 110 has a memory which holds 4×4 reference quantization step values to be used to quantize the low frequency band data (4×4 coefficient values in this embodiment). The coefficient quantizing unit 110 multiplies each reference quantization step value by the quantization parameter q set by the quantization parameter setting unit 109, thereby calculating quantization step values to be used for actual quantization.

After that, the coefficient quantizing unit 110 quantizes the low frequency band data (16 coefficient values; FIG. 4) of each pixel block stored in the low frequency band memory 104 and outputs the quantization result to the coefficient encoder 111.

The coefficient encoder 111 run-length-encodes the quantized coefficient values output from the coefficient quantizing unit 110 by combining the number of continuous zeros and a non-zero coefficient value. This encoding need not always be done using this method. For example, a method of separating the bits of each coefficient value and run-length-encoding only the upper-bit portion may be used, like the coefficient encoder 106. The code stream storage memory 107 stores the low frequency band encoded data. The encoded data of the low frequency band data is written in the area $L \times (1-\alpha)$ allocated in advance for the low frequency band in the code stream storage memory 107. If the low frequency band area is full, the free memory area W remaining in the area $L \times \alpha$ for high frequency band encoded data is used.

The current total code amount of the encoded data obtained by the encoding processing of the low frequency band data will be defined as CL_L. The code amount obtained by the encoding processing of the high frequency band data is determined as CL_H, as already described. The total code amount "CL_L+CL_H" must be equal to or smaller than the target code amount L. In other words, the total code amount CL_L of the low frequency band data must always be equal to or smaller than the low frequency band target code amount L'.

The above-described default quantization parameter q is statistically obtained. For this reason, $$CL\_L+CL\_H>L (\text{or } CL\_L>L')$$

may occur during the encoding processing of image data of interest. That is, the total code amount may exceed the target code amount L.

Upon determining that CL_L>L', an instruction to change the quantization parameter q is sent to the quantization parameter updating unit 113, and the controller 116 is notified of it. Upon receiving the notification, the controller 116 stops each processor which is executing the encoding processing of the low frequency band data and discards all encoded data of the low frequency band data stored in the code stream storage memory 107 so far.

After that, the quantization parameter updating unit 113 sets, in the coefficient quantizing unit 110, a parameter (to be referred to as an updating parameter r) to update the quantization parameter q and generate a smaller code amount. The updating parameter r set by the quantization parameter updating unit 113 has a value of 1 or more and is used to multiply the quantization parameter q set by the quantization parameter setting unit 109. More specifically, let Q0 be the reference quantization step value held in the quantization parameter setting unit 109. In this case, the coefficient quantizing unit 110 calculates a new quantization step value $Q=Q0 \times q \times r$. Note that the new quantization step value Q is larger than the preceding quantization step value $Q0 \times q$. Note that overflow of second time or more has occurred, the quantization parameter updating unit 113 sets the updating parameter r larger than that of the preceding time.

In the above-described example, $Q=Q0 \times q \times r$ is calculated as a new quantization step value. However, the present invention is not limited to this. For example, the quantization parameter setting unit 109 may have a memory to hold a plurality of quantization tables which store quantization step values. A quantization step value may be determined by selecting a quantization table uniquely determined by q and r which are input as addresses. An important point is that every time CL_L>L' is determined, the encoding compression ratio is raised by using a quantization step value larger than that used at that point in time.

Assume that the coefficient quantizing unit 110 receives the parameter r to update the quantization parameter from the quantization parameter updating unit 113. In this case, the controller 116 starts executing the quantization processing again from the low frequency band data of the pixel block at the start of the low frequency band memory 104. Then, the coefficient encoder 111 starts encoding.

When the code amount controller 108 is defined as a first code amount controller, the quantization parameter setting unit 109, quantization parameter updating unit 113, and code amount detector 112 function as a second code amount controller.

When the code stream storage memory 107 thus stores the low frequency band data encoded data of all pixel blocks within the range of the low frequency band target code amount L', a code stream generator 114 generates encoded data in a predetermined format and outputs it to a code outputting unit 115.

When inputting the encoding target image data, the code outputting unit 115 generates a file header at the output destination (e.g., hard disk drive) and subsequently outputs the code stream generated by the code stream generator 114, thereby generating one encoded data file.

FIG. 15 shows the structure of an encoded data file output from the image encoding apparatus according to the embodiment. The file header includes various kinds of information necessary for decoding, such as the number of horizontal pixels, the number of vertical pixels, and the number of color components (the number of color components is one in the monochrome image exemplified in this embodiment) of the image, and the number of bits of each pixel. The header also includes information representing the presence/absence of high frequency band encoded data and the number Bmin of the least significant plane included in the code stream. The low frequency band encoded data of each pixel block of the image follows the file header. High frequency band encoded data follows the low frequency band encoded data. The high frequency band encoded data first includes the upper-bit encoded data of all pixel blocks and then lower-bit encoded data. N in FIG. 15 indicates the total number of pixel blocks. The upper-bit encoded data is formed by concatenating the upper-bit portion encoded data of the respective pixel blocks in the raster scan order of the pixel blocks. The lower-bit encoded data is formed by arranging the lower-bit portion encoded data of the respective pixel blocks in the order of bitplane. The bitplane i is formed by collecting the data of the bitplanes i of the respective pixel blocks in the raster scan order. However, the data are not always collected from all the pixel blocks because the block MB(n) in which the boundary bit B(n)<i may exist.

The code structure shown in FIG. 15 is merely an example. Any form suitable to store the low frequency band encoded data and the high frequency band encoded data which is separated into the upper-bit portions and the lower-bit portions and encoded is applicable. For example, a data structure in which macro blocks each including a plurality of pixel blocks or tiles each including a plurality of macro blocks are arranged may be used in place of the structure shown in FIG. 15.

The encoded data generated by the image encoding apparatus of this embodiment can be reproduced by shifting the upper-bit portions to the upper side by bits represented by the boundary bit-position B, reconstructing the lower-bit portions in accordance with a required image level, and performing decoding in a process reverse to that of encoding.

As described above, the image encoding apparatus of this embodiment performs frequency transform in each pixel block (having a size of 16×16 pixels in the embodiment) including a plurality of pixels, thereby separating the image data into low frequency band data and high frequency band data. The visually important low frequency band data is stored in the memory (low frequency band memory 104). The high frequency band data is first separated into upper-bit portions and lower-bit portions and encoded. At this time, it is possible to limit the code amount of the high frequency band data within a predetermined range (L×α in this embodiment) by forming data in the order of bitplane based on the uncompressed lower-bit portions and discarding the lower bits in accordance with the generated code amount. After the high frequency band data has been encoded, the quantization steps are set based on the generated code amount of the high frequency band data, and the low frequency band data is encoded. This enables finely controlling quantization of the low frequency band data and obtain a high-quality image within the target code amount.

Modification of First Embodiment

A modification of the first embodiment will be described below, which implements the same processing as in the first embodiment by a computer program read out and executed by a computer.

Figure 14:
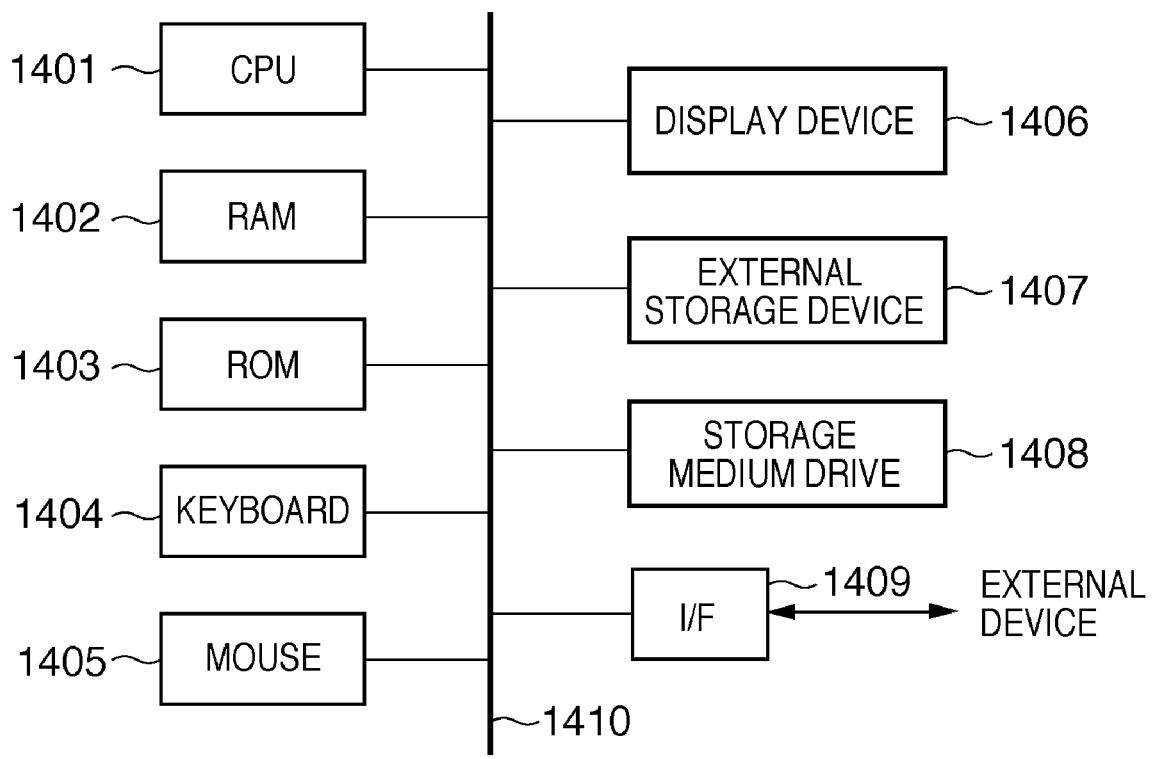
FIG. 14 is a block diagram showing the arrangement of an information processing apparatus according to a modification of the first embodiment.

FIG. 14 is a block diagram showing the arrangement of an information processing apparatus (e.g., personal computer) according to the modification.

Referring to FIG. 14, a CPU 1401 controls the entire apparatus and executes image encoding processing and decoding processing to be described later using programs and data stored in a RAM 1402 or a ROM 1403. The RAM 1402 has an area to store programs and data read out from an external storage device 1407 or a storage medium drive 1408 or downloaded from an external device via an I/F 1409. The RAM 1402 also has a work area to be used by the CPU 1401 to execute various kinds of processing. The ROM 1403 stores a boot program, the setting program of the apparatus, and data. A keyboard 1404 and a mouse 1405 can input various kinds of instructions to the CPU 1401.

A display device 1406 including a CRT or a liquid crystal panel can display image and character information. The external mass storage device 1407 is, e.g., a hard disk drive. The external storage device 1407 stores the files of an OS (Operating System), programs for image encoding and decoding to be described later, encoding target image data, and the encoded data of decoding target images. The CPU 1401 loads the programs and data to a predetermined area on the RAM 1402 and executes them.

The storage medium drive 1408 reads out programs and data recorded on a storage medium such as a CD-ROM or a DVD-ROM and outputs them to the RAM 1402 or the external storage device 1407. Note that the programs for image encoding and decoding processing to be described later, encoding target image data, and encoded data of decoding target images may be recorded on the storage medium. In this case, the storage medium drive 1408 loads the programs and data to a predetermined area on the RAM 1402 under the control of the CPU 1401.

The I/F 1409 connects an external device to the apparatus to enable data communication between them. The I/F 1409 can also input, e.g., encoding target image data or the encoded data of a decoding target image to the RAM 1402, the external storage device 1407, or the storage medium drive 1408 of the apparatus. A bus 1410 connects the above-described units.

In the above arrangement, when the apparatus is powered on, the CPU 1401 loads the OS from the external storage device 1407 to the RAM 1402 in accordance with the boot program in the ROM 1403. This enables input from the keyboard 1404 or the mouse 1405 and GUI display on the display device 1406. The user operates the keyboard 1404 or the mouse 1405 to instruct activation of an image encoding processing application program stored in the external storage device 1407. Then, the CPU 1401 loads the program to the RAM 1402 and executes it. This makes the apparatus function as an image encoding apparatus.

Figure 16A:
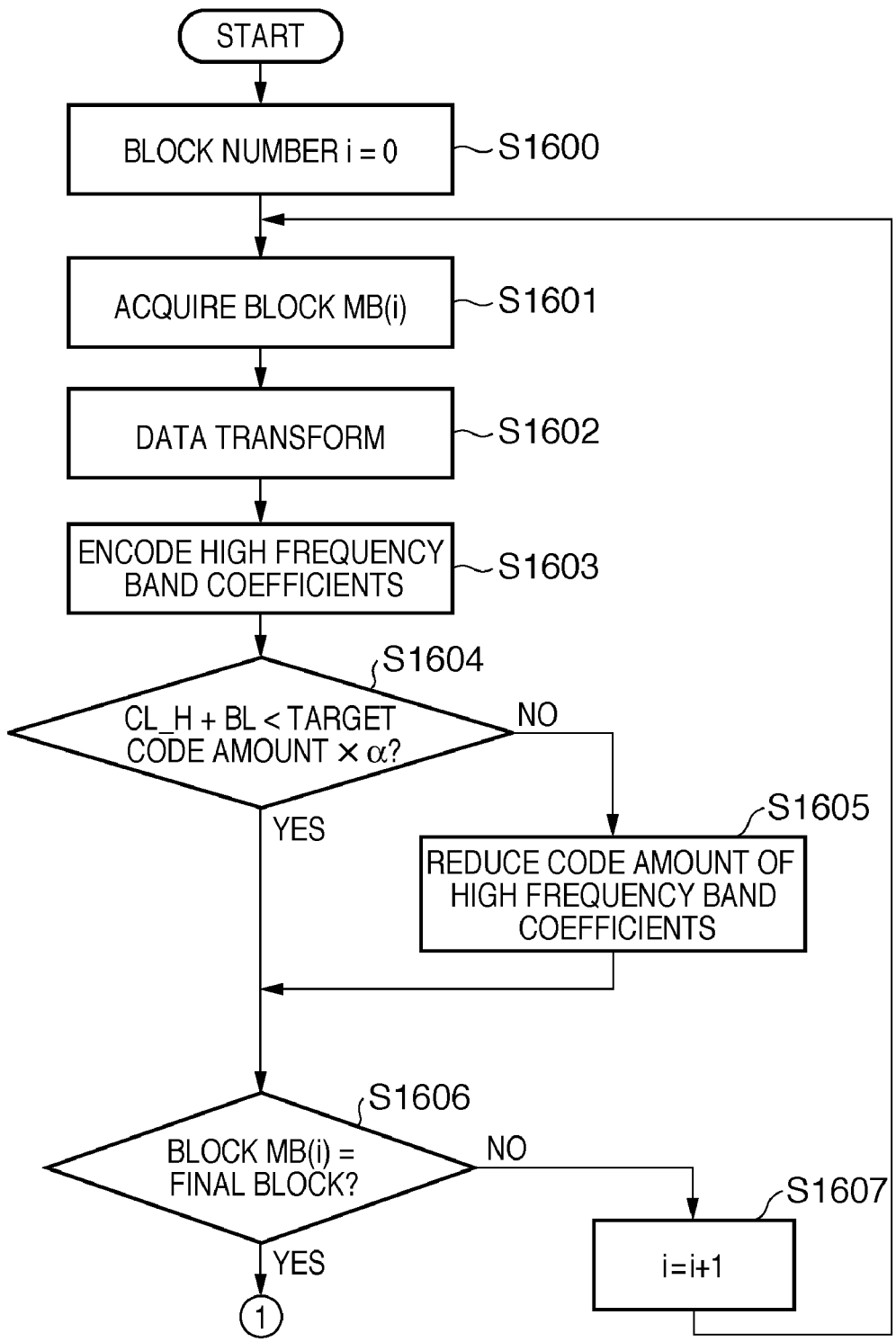
FIGS. 16A and 16B are a flowchart illustrating the procedure of processing according to a modification of the first embodiment.
Figure 16B:
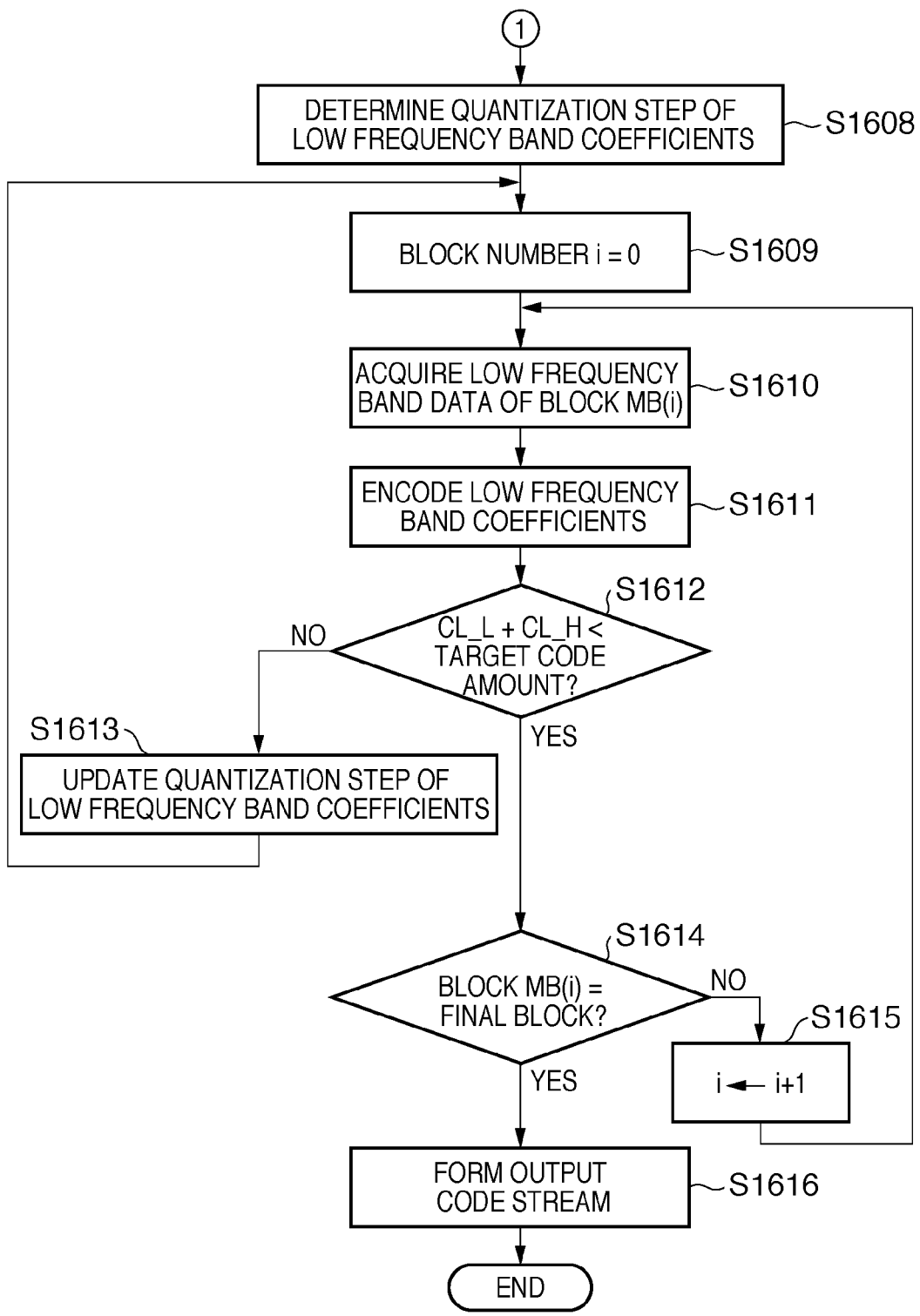

The procedure of processing of the image processing applicator program executed by the CPU 1401 will be described below with reference to the flowchart in FIGS. 16A and 16B. Basically, the program includes a function corresponding to each constituent element shown in FIG. 1. Areas such as the low frequency band memory 104 and the code stream storage memory 107 in FIG. 1 are allocated in the RAM 1402 in advance.

In step S1600, initialization processing before the start of encoding is performed. In this processing, the variable i that holds the number of a pixel block to be processed is initialized to 0.

In step S1601, ith pixel block data is formed while sequentially inputting encoding target image data from an external device connected via the I/F 1409 and storing it in the RAM 1402 (corresponding to the processing of the image input unit 101 and the block divider 102). At this time, the total number of pixel blocks included in the image is calculated by referring to the header of the image data.

In step S1602, the pixel block MB(i) of interest undergoes frequency transform processing such as Hadamard transform so that corresponding transform coefficient data (high frequency band data and low frequency band data) are stored in the RAM 1402 (corresponding to the processing of the frequency transform unit 103).

In step S1603, the high frequency band data of the pixel block MB(i) is encoded (corresponding to the processing of the coefficient quantizing unit 105 and the coefficient encoder 106). The RAM 1402 stores the generated code stream.

In step S1604, the code amount CL_H+BL of the high frequency band encoded data is compared with the target code amount L×α. If CL_H+BL<L×α, the process advances to step S1606. Otherwise, the code amount of the high frequency band is reduced by deleting bitplanes from the lower side (step S1605). The processes in steps S1604 and S1605 correspond to the processing of the code amount controller 108.

In step S1606, it is determined whether the pixel block MB(i) which has undergone the encoding processing is the final block of the encoding target image. More specifically, whether the block number i=N−1 is checked. If i=N−1, the process advances to step S1608. If i≠N−1, the block number i is incremented in step S1607. The processing is then repeated from step S1601 for the next block.

When the process has advanced to step S1608, the high frequency band data of all blocks have already been encoded, and the total code amount CL_H is definite. Hence, the low frequency band target code amount L' is calculated, and the initial quantization step is determined (corresponding to the processing of the quantization parameter setting unit 109).

In step S1609, 0 is set in the variable i that holds the block number to prepare for the start of encoding of the low frequency band data.

In step S1610, the low frequency band data of the pixel block MB(i) of interest is read out from the RAM 1402. The readout low frequency band data of the pixel block MB(i) is quantized using the quantization step determined in step S1608 and then encoded (step S1611). These processes correspond to the processing of the coefficient quantizing unit 110 and the coefficient encoder 111. The RAM 1402 stores the generated encoded data.

In step S1612, the sum of the code amount CL_H of the already encoded high frequency band data and the code amount CL_L of the low frequency band data generated so far is compared with the target code amount L. Instead, the code amount CL_L may be compared with the low frequency band target code amount L'.

If CL_H+CL_L<L (or if CL_L<L'), the process advances to step S1614. Otherwise, the process advances to step S1613 (corresponding to the processing of the code amount detector 112).

In step S1613, the quantization parameter is updated to make the quantization step large. The process returns to step S1609 to resume the encoding processing again from the low frequency band data of the block MB(0) using the updated quantization step (corresponding to the processing of the quantization parameter updating unit). At this time, the code of the low frequency band data stored in the RAM 1402 is discarded.

In step S1614, it is determined whether the encoded block MB(i) is the final block of the encoding target image. If the block MB(i) is the final block, i.e., if the block number i=N−1, the process advances to step S1616. If the block BM(i) is not the final block (i≠N−1), the variable i that holds the block number is incremented in step S1615. The processing is then repeated from step S1610 for the next block.

In step S1616, final encoded data is generated from the encoded data of all blocks stored in the RAM 1402 and output to the external device via the I/F 1409 (corresponding to the processing of the code stream generator 114 and the code outputting unit 115).

As can be seen, even this modification can provide the same functions and effects as in the first embodiment, as described above. More specifically, the code amount of the high frequency band data is adjusted by discarding the high frequency band data. Then, the quantization step for the low frequency band data is set, and the low frequency band data is encoded within the target code amount. This enables to easily generate encoded data having high image quality within the target code amount using a small memory capacity.

Second Embodiment

In the first embodiment and its modification, image data is separated into low frequency band data and high frequency band data, and the high frequency band data is encoded first. After that, the low frequency band data is encoded by setting the quantization parameter of the low frequency band based on the code amount of the high frequency band data and repeatedly adjusting the quantization parameter such that the code amount falls within the range of the target code amount. However, the process time for re-encoding may pose a problem if, for example, it is necessary to encode many images within a predetermined time.

As the second embodiment, an embodiment preferable for, e.g., a digital camera capable of switching between a single shooting mode and a continuous shooting mode will be described. In the single shooting mode without strict restriction of time for encoding processing of one image, low frequency band data is re-encoded as needed, as in the first embodiment. On the other hand, in the continuous shooting mode that requires fast encoding processing, low frequency band data is not encoded. The "single shooting mode and continuous shooting mode" translates to a "large/small number of image data to be encoded or a long or short unit time".

In the second embodiment as well, target image data is assumed to be monochrome image data for the descriptive convenience. However, the embodiment may apply to RGB image data or CMYK color image data. The image is formed from W horizontal pixels and H vertical pixels.

The block diagram of the image encoding apparatus according to the second embodiment is basically the same as that in FIG. 1 described in the first embodiment. The second embodiment is different from the first embodiment in that an operation unit (not shown) inputs an operation mode instruction to a controller 116 which controls the operation of whole blocks.

Processing operations of the second embodiment which are different from the first embodiment will be described below.

An operation mode signal input to the image encoding apparatus of the second embodiment takes binary values "0" and "1". An operation mode signal "0" sets a "normal mode" in which only single image data undergoes encoding. An operation mode signal "1" sets a "high-speed mode" in which a plurality of image data undergo encoding. When the process time is not limited, and code amount control by re-encoding low frequency band data as described in the first embodiment is permitted, the normal mode is selected. On the other hand, encoding processing should quickly end without re-encoding low frequency band data, the high-speed mode is selected.

When the normal mode is selected, i.e., when the operation mode signal is "0", the image encoding apparatus of the second embodiment performs the same operation as described in the first embodiment.

When the high-speed mode is selected, i.e., when the operation mode signal is "1", the same operation as described in the first embodiment is executed up to high frequency band data encoding and quantization parameter setting for low frequency band data. However, when encoding low frequency band data, a code amount controller 108 is operated to delete partial encoded data in the encoded data of high frequency band data in a memory 107 without encoding low frequency band data a plurality of number of times.

Figure 17:
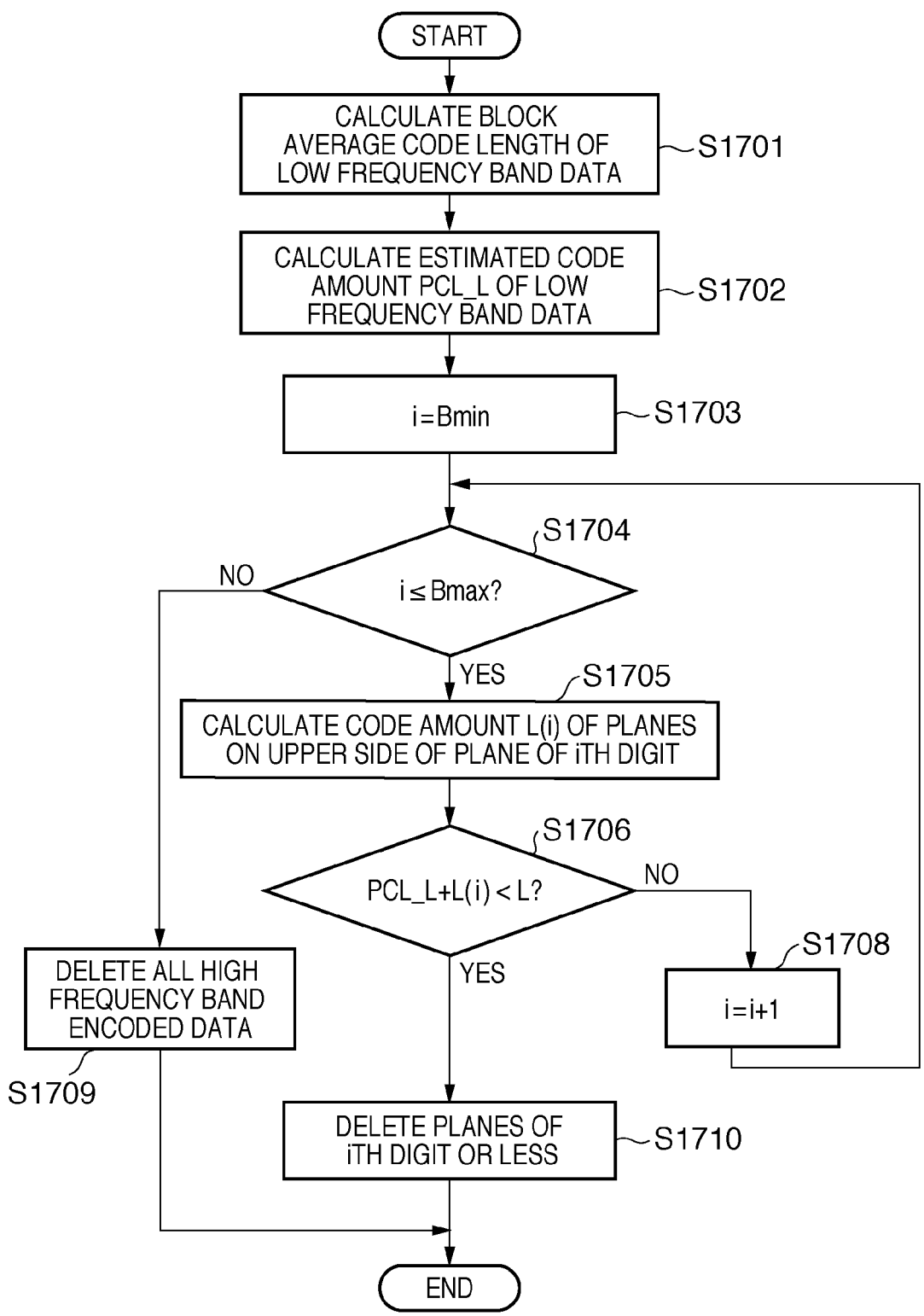
FIG. 17 is a flowchart illustrating the procedure of processing of a code amount controller 108 according to the second embodiment.

FIG. 17 is a flowchart illustrating the procedure of code amount reduction processing executed by the code amount controller 108 upon determining that the memory 107 has no free space after encoding of the low frequency band data of an mth pixel block MB(m). The procedure of the code amount reduction processing executed by the code amount controller 108 will be described below with reference to FIG. 17.

First, the code amount controller 108 calculates the average code length of the pixel blocks of low frequency band data stored in the memory 107 (step S1701). The average code length can be calculated by dividing a code amount CL_L of low frequency band data output so far by the number (m+1) of encoded blocks.

Next, the code amount controller 108 multiplies the calculated average code length by the total number N of blocks, thereby obtaining an estimated code amount PCL_L of the low frequency band data which is assumed to have been encoded up to the final block (step S1702). PCL_L is given by $$PCL\_L = CL\_L/(m+1) \times N$$

where the first term on the right hand side is the block average code length obtained in step S1701.

The code amount controller 108 sets, in a variable i, a least significant bitplane Bmin held as the lower-bit portion of the high frequency band data (step S1703).

The code amount controller 108 compares the variable i with a maximum value Bmax of a boundary bit-position B (step S1704). If i≦Bmax, the process advances to step S1705. Otherwise, the process advances to step S1709.

In step S1705, the code amount controller 108 calculates a code amount L(i) of the high frequency band data after deleting the planes of the ith digit or less. Letting P(i) be the code amount of the plane of the ith digit, L(i) is obtained by $$L(i)=CL\_H_2 (\text{when } i=B\text{max})$$

$$P(i)=\Sigma Cp(j,i) (j=0 \text{ to } m)$$

$$L(i)=L(i+1)+P(i+1) \times N (\text{when } i \neq B\text{max})$$

In step S1706, the code amount controller 108 compares the sum of the estimated code amount PCL_L of the low frequency band data and the code amount L(i) of the high frequency band data after deleting the planes of the ith digit or less with a target code amount L. If PCL_L+L(i)<L, the process advances to step S1710. Otherwise, the process advances to step S1708.

In step S1708, the variable i is incremented, and the process returns to step S1704.

In step S1710, the code amount controller 108 deletes the planes of the ith digit or less from the memory 107 and rearranges the code streams of the lower-bit portions. This processing corresponds to the operation of the code amount controller of the first embodiment and is the same as the operation in step S1306.

If i exceeds Bmax, i.e., if it is impossible to allocate a sufficient free space even by deleting all encoded data of the lower-bit portions, the process advances to step S1709. In this case, the code amount controller 108 deletes all high frequency band encoded data from the memory 107. More specifically, both the encoded data of the upper-bit portion and the encoded data of the lower-bit portion of the high frequency band data are deleted. In some cases, it may be impossible to allocate a sufficient free space even by deleting the whole high frequency band data. In this embodiment, however, setting a quantization step in a coefficient quantizing unit 110 and the capacity of the memory 107 prevents memory overflow from taking place due to only the low frequency band data.

With the above processing, if the code amount of the low frequency band is large, the encoding target image is encoded within a predetermined code amount while allocating a free space by deleting the already encoded data of the high frequency band.

As described above, according to the second embodiment, the image encoding apparatus has two modes, i.e., the normal mode to control the code amount with priority given to the image quality and the high-speed mode to give priority to the process speed. The apparatus can operate while switching between the two modes in accordance with the application purpose.

A computer program can implement the same processing as in the second embodiment, as is apparent from the above-described modification of the first embodiment, and a description thereof will not be repeated.

Third Embodiment

In the second embodiment, the code amount control method is switched in accordance with the image shooting mode. However, the method can also be switched based on any other information. In the third embodiment, an example will be described in which the code amount control method is switched based on the size of an image to be taken.

The operation of the third embodiment is different from that of the second embodiment only in the method of setting the operation mode signal to be input to the controller.

An image encoding apparatus according to the third embodiment encodes three kinds of images which have different numbers of horizontal and vertical pixels. The images will be referred to as S, M, and L in ascending order of size. For L, i.e., if the resolution is high, the number of pixels that undergo the encoding processing is large. This requires a process time longer as compared to S and M and makes degradation in the high frequency band unnoticeable. Conversely, an image having a low resolution mainly contains components in the low frequency band, and visual degradation is therefore noticeable. For these reasons, in shooting at a high resolution (when the image type is L in this embodiment), "1" is input as the operation mode signal to set the high-speed mode. For S or M, the normal mode is set.

Note that a computer program can obviously implement processing corresponding to the third embodiment, like the above-described modification of the first embodiment.

In the third embodiment, if the tolerance of distortion of high frequency components is large, the high-speed mode is selected. If the tolerance of distortion is small, the normal mode is applied. Hence, the same effect can be obtained by selecting the mode based on not the image size but, e.g., image quality setting (low, medium, and high). For example, the high-speed mode is selected at high image quality, whereas the normal mode is selected at medium or low image quality.

Other Embodiments

In the above-described embodiments, Hadamard transform of every 4×4 pixels is applied twice to transform image data into frequency band data. However, the present invention is not limited to this. Another frequency transform means such as DCT is also usable. Transform into frequency band data need not always be done in independent blocks. For example, lapped orthogonal transform or lapped biorthogonal transform of performing transform processing over blocks may be used. Additionally, different frequency transform techniques may be applied to the first and second stages.

The above-described example uses the same method as JPEG Baseline to encode an upper-bit portion. However, another entropy encoding technique of, e.g., performing binary arithmetic coding of each bitplane is also usable. In the above-described embodiments, transform into frequency band data is performed using pixel blocks each including 16×16 pixels. However, the block size is not limited to this. Any other block size such as 8×8 or 32×32 is also applicable.

The embodiments have been described using monochrome image data encoding as an example. However, the present invention is also applicable to image data having any other color space such as RGB, CMYK, Lab, or YCbCr. Hence, the present invention is not limited by the number of color components or the type of color space.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-204775, filed Aug. 7, 2008, which is hereby incorporated by reference herein in its entirety.

What is claimed is:

1. An image encoding apparatus which encodes image data and generates encoded data within a target code amount L, comprising:
    an input unit which inputs, from encoding target image data, image data of a pixel block including a plurality of pixels;
    a frequency transform unit which frequency-transforms the input image data of the pixel block to generate high frequency band data and low frequency band data;
    a storage unit which stores, in a buffer memory, the low frequency band data obtained by said frequency transform unit;
    a first encoder which quantizes and encodes the high frequency band data obtained by said frequency transform unit and stores obtained encoded data in a code stream storage memory;
    a detector which detects a total code amount CL_H of the encoded data of the high frequency band data generated by said first encoder;
    a determiner which, when said first encoder has finished encoding processing of high frequency band data of all pixel blocks of the encoding target image data, sets, as a low frequency band target code amount, a capacity obtained by subtracting the total code amount CL_H of the encoded data of the high frequency band data from the target code amount L and determines an encoding parameter of the low frequency band data based on the low frequency band target code amount;
    a second encoder which encodes the low frequency band data stored in the buffer memory, in accordance with the encoding parameter determined by said determiner and stores obtained encoded data in the code stream storage memory; and
    an outputting unit which, when said second encoder has finished encoding processing of low frequency band data of all pixel blocks, outputs the encoded data of the low frequency band data and the encoded data of the high frequency band data both of which are stored in the code stream storage memory and have a data structure in a preset format.

2. The apparatus according to claim 1, wherein said frequency transform unit comprises:
    a divider which divides image data of a pixel block of interest into partial image data of a plurality of sub-pixel blocks;
    a first data transform unit which frequency-transforms partial image data of each sub-pixel block obtained by said divider into one DC component value and a plurality of AC component values;
    a second data transform unit which frequency-transforms the DC component values of the sub-pixel blocks obtained by said first data transform unit again into one DC component value and a plurality of AC component values; and
    a unit which outputs the AC component values of the sub-pixel blocks obtained by said first data transform unit as the high frequency band data and a transform result obtained by said second data transform unit as the low frequency band data.

3. The apparatus according to claim 1, wherein said first encoder comprises:
    a quantizing unit which quantizes high frequency band data of a pixel block of interest;
    a separator which separates, in accordance with boundary bit-position information determined when encoding a pixel block before the pixel block of interest, each coefficient value included in the high frequency band data of the pixel block of interest into an upper-bit portion on an upper side of a boundary bit-position represented by the boundary bit-position information and a lower-bit portion on a lower side from the boundary bit-position;
    an upper-bit portion encoder which run-length-encodes the upper-bit portion to generate upper-bit encoded data;
    a lower-bit portion encoder which arranges the bits in the lower-bit portion and the sign bits if necessary to generate lower-bit encoded data;
    an updating unit which updates the boundary bit-position based on distribution of the upper-bit portions; and
    a unit which outputs the upper-bit encoded data and the lower-bit encoded data as the encoded data from said first encoder.

4. The apparatus according to claim 3, further comprising a unit which,
    if the total code amount CL_H of the high frequency band data detected by said detector has reached a preset allowable code amount before said first encoder has finished encoding of the high frequency band data of all pixel blocks of the encoding target image data,
    discards, out of the encoded data of the high frequency band data stored in the code stream storage memory, the lower-bit encoded data and the upper-bit encoded data in the order named until the total code amount CL_H of the high frequency band data becomes smaller than the preset allowable code amount, and prohibits said first encoder from outputting encoded data on a lower side from a bit position of the discarded data.

5. The apparatus according to claim 1, further comprising:
a unit which detects a total code amount CL_L of the encoded data of the low frequency band data generated by said second encoder; and
a unit which, if the detected total code amount CL_L has reached the low frequency band target code amount before said second encoder has finished encoding of the low frequency band data of all pixel blocks of the encoding target image data,
discards all encoded data of the low frequency band data stored in the code stream storage memory,
updates the encoding parameter to further raise an encoding compression ratio of said second encoder, and
causes said second encoder to execute re-encoding from low frequency band data of a first pixel block.

6. The apparatus according to claim 1, further comprising:
a unit which detects a total code amount CL_L of the encoded data of the low frequency band data generated by said second encoder; and
a selector which selects one of a first code amount controller and a second code amount controller, which adjust a code amount,
said first code amount controller comprising:
a unit which discards all encoded data of the low frequency band data stored in the code stream storage memory if the detected total code amount CL_L has reached the low frequency band target code amount before said second encoder has finished encoding of the low frequency band data of all pixel blocks of the encoding target image data,
a unit which updates the encoding parameter to further raise an encoding compression ratio of said second encoder, and
a unit which causes said second encoder to execute re-encoding from low frequency band data of a first pixel block, and
said second code amount controller comprising:
a calculation unit which calculates an estimated code amount PCL_L of the low frequency band data of all pixel blocks of the encoding target image data based on an average code amount of the low frequency band data of the pixel blocks if the detected total code amount CL_L has reached the low frequency band target code amount before said second encoder has finished encoding of the low frequency band data of all pixel blocks of the encoding target image data, and
a deletion unit which deletes partial encoded data of the encoded data of the high frequency band data stored in the code stream storage memory, in accordance with a preset priority order until a relationship between the estimated code amount PCL_L calculated by said calculation unit, the total code amount CL_H of the high frequency band data, and the target code amount satisfies $$PCL\_L + CL\_L < \text{target code amount}.$$

7. The apparatus according to claim 6, wherein said selector selects one of said first code amount controller and said second code amount controller in accordance with a size of the encoding target image data or whether the encoding target image data includes one image or a plurality of images.

8. A method of controlling an image encoding apparatus which encodes image data and generates encoded data within a target code amount L, comprising the steps of:
inputting, from encoding target image data, image data of a pixel block including a plurality of pixels;
frequency-transforming the input image data of the pixel block to generate high frequency band data and low frequency band data;
storing, in a buffer memory, the low frequency band data obtained in the frequency transforming step;
quantizing and encoding the high frequency band data obtained in the frequency transforming step and storing obtained encoded data in a code stream storage memory;
detecting a total code amount CL_H of the encoded data of the high frequency band data generated in the step of quantizing and encoding the high frequency band data;
when encoding processing of high frequency band data of all pixel blocks of the encoding target image data has ended in the step of quantizing and encoding the high frequency band data, setting, as a low frequency band target code amount, a capacity obtained by subtracting the total code amount CL_H of the encoded data of the high frequency band data from the target code amount L and determining an encoding parameter of the low frequency band data based on the low frequency band target code amount;
encoding the low frequency band data stored in the buffer memory in accordance with the encoding parameter determined in the step of determining the encoding parameter and storing obtained encoded data in the code stream storage memory; and
when encoding processing of low frequency band data of all pixel blocks has ended in the step of encoding the low frequency band data, outputting the encoded data of the low frequency band data and the encoded data of the high frequency band data both of which are stored in the code stream storage memory and have a data structure in a preset format.

9. A non-transitory computer-readable storage medium storing a computer program which is loaded in a computer and executed to cause the computer to function as an image encoding apparatus of claim 1.

* * * * *